(12) United States Patent
Ohgata et al.

(10) Patent No.: US 10,451,126 B2
(45) Date of Patent: Oct. 22, 2019

(54) CONTROL DEVICE OF VEHICLE POWER TRANSMISSION DEVICE

(71) Applicant: TOYOTA JIDOSHA KABUSHIKI KAISHA, Toyota-shi, Aichi (JP)

(72) Inventors: Yusuke Ohgata, Miyoshi (JP); Hiroki Kondo, Miyoshi (JP); Makoto Sawada, Nisshin (JP); Shinya Toyoda, Nisshin (JP); Shuji Moriyama, Nagakute (JP); Kyohei Suzumura, Nagoya (JP); Hiroki Takeda, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 10 days.

(21) Appl. No.: 15/974,742

(22) Filed: May 9, 2018

(65) Prior Publication Data
US 2018/0328422 A1    Nov. 15, 2018

(30) Foreign Application Priority Data
May 9, 2017    (JP) .................................. 2017-093417

(51) Int. Cl.
*F16D 48/10* (2006.01)
*F16H 61/02* (2006.01)
(Continued)

(52) U.S. Cl.
CPC ......... *F16D 48/10* (2013.01); *F16H 61/0276* (2013.01); *F16D 48/062* (2013.01);
(Continued)

(58) Field of Classification Search
None
See application file for complete search history.

(56) References Cited

U.S. PATENT DOCUMENTS 5,067,603 A * 11/1991 Kato ..................... F16D 48/066
192/3.31
5,899,121 A *  5/1999 Mulvihill .............. F16H 61/705
74/335

(Continued)

FOREIGN PATENT DOCUMENTS

JP    2017-002987 A    1/2017

*Primary Examiner* — Colby M Hansen
(74) *Attorney, Agent, or Firm* — Oliff PLC

(57) ABSTRACT

A control device of a vehicle power transmission device including a first power transmission path transmitting power by engaging a first clutch, a sub-clutch and a second power transmission path transmitting power by engaging a second clutch each disposed between an engine and drive wheels and parallel to each other, the device including a fail-safe valve for preventing simultaneous engagement of the first and second clutches, the fail-safe valve configured to be switched to a fail-safe spool position preventing simultaneous engagement of the first and second clutches by a hydraulic pressure of a hydraulic fluid supplied to the first clutch or an output pressure of a first electromagnetic valve controlling the hydraulic pressure and the hydraulic pressure of the hydraulic fluid supplied to the second clutch or an output pressure of a second electromagnetic valve controlling the hydraulic pressure, the second electromagnetic valve configured to increase the output pressure.

7 Claims, 8 Drawing Sheets

(51) Int. Cl.
 *F16D 48/06* (2006.01)
 *F16H 61/66* (2006.01)
 *F16H 59/70* (2006.01)
 *F16D 48/02* (2006.01)
 *F16H 61/12* (2010.01)
 *F16H 37/02* (2006.01)

(52) U.S. Cl.
 CPC .... *F16D 2048/0257* (2013.01); *F16H 37/022* (2013.01); *F16H 2059/704* (2013.01); *F16H 2061/1236* (2013.01); *F16H 2061/661* (2013.01); *F16H 2200/2041* (2013.01)

(56) References Cited

U.S. PATENT DOCUMENTS

| | | | | |
|---|---|---|---|---|
| 6,139,459 A | * | 10/2000 | Suzuki | F16H 61/0206 475/127 |
| 6,595,896 B1 | * | 7/2003 | Gierling | B60W 10/02 477/39 |
| 7,811,188 B2 | * | 10/2010 | Brown | F16H 61/0025 474/18 |
| 8,512,202 B2 | * | 8/2013 | Oota | B60K 6/48 477/5 |
| 8,781,674 B2 | * | 7/2014 | Iraha | F16D 48/062 477/34 |

* cited by examiner

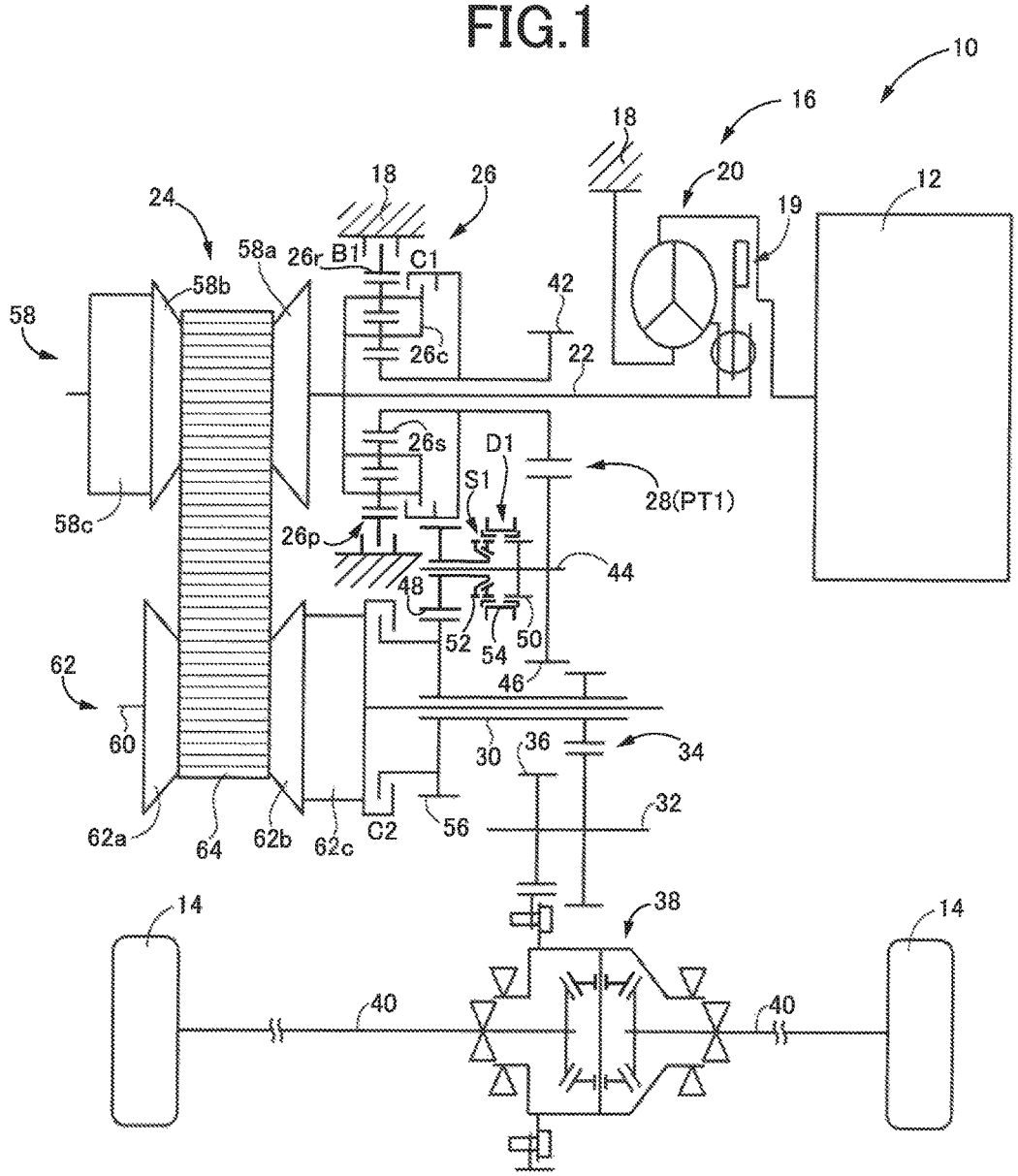

CONTROL DEVICE OF VEHICLE POWER TRANSMISSION DEVICE

This application claims priority from Japanese Patent Application No. 2017-093417 filed on May 9, 2017, the disclosure of which is herein incorporated by reference in its entirety.

TECHNICAL FIELD

The present invention relates to a control device of a vehicle power transmission device including two power transmission paths disposed parallel to each other.

BACKGROUND ART

There is known a vehicle power transmission device that includes a first power transmission path transmitting power by engaging a first clutch and a dog clutch, and a second power transmission path transmitting power by engaging a second clutch each disposed between an engine and drive wheels in parallel. This corresponds to a power transmission device described in Patent Document 1. In Patent Document 1, it is described that the power transmission device having the configuration described above includes a fail-safe valve for preventing simultaneous engagement of the first clutch and the second clutch. When a total hydraulic pressure, which is sum of an output pressure from a C1 pressure electromagnetic valve controlling the hydraulic pressure of the first clutch and an output pressure from a C2 pressure electromagnetic valve controlling the hydraulic pressure of the second clutch, reaches a predetermined value or more the fail-safe valve is switched to a fail-safe spool position (state) to interrupt communication between an oil chamber of the first clutch and the C1 pressure electromagnetic valve.

PRIOR ART DOCUMENT

Patent Document

Patent Document 1: Japanese Laid-Open Patent Publication No. 2017-2987

SUMMARY OF THE INVENTION

Technical Problem

In Patent Document 1, since the fail-safe valve must promptly be switched to the fail-safe spool position if simultaneous engagement of the first clutch and the second clutch occurs, the output pressure of the C2 pressure electromagnetic valve is controlled to always be a predetermined hydraulic pressure or more during running of a vehicle using the second power transmission path, which is associated with an increase in electric power consumption of the C2 pressure electromagnetic valve, leaving room for improvement in terms of fuel consumption.

The present invention was conceived in view of the situations and it is therefore an object of the present invention to provide a control device capable of reducing an electric power consumption of an electromagnetic valve in a vehicle power transmission device including a first power transmission path and a second power transmission path disposed parallel to each other and including a fail-safe valve preventing simultaneous engagement of a first clutch and a second clutch.

Solution to Problem

A first aspect of the present invention provides a control device of a vehicle power transmission device including a first power transmission path transmitting power by engaging a first clutch and a sub-clutch and a second power transmission path transmitting power by engaging a second clutch each disposed between an engine and drive wheels and parallel to each other, the vehicle power transmission device including a fail-safe valve for preventing simultaneous engagement of the first clutch and the second clutch, the fail-safe valve configured to be switched to a fail-safe spool position preventing simultaneous engagement of the first clutch and the second clutch by a hydraulic pressure of a hydraulic fluid supplied to the first clutch or an output pressure of a first electromagnetic valve controlling the hydraulic pressure and a hydraulic pressure of a hydraulic fluid supplied to the second clutch or an output pressure of a second electromagnetic valve controlling the hydraulic pressure, the second electromagnetic valve configured to increase the output pressure in accordance with an increase in an instruction current, the control device comprising: an instruction pressure setting portion lowering an instruction pressure of the second electromagnetic valve during release of the sub-clutch as compared to when the sub-clutch is engaged.

A second aspect of the present invention provides the control device of a vehicle power transmission device recited in the first aspect of the invention, wherein the instruction pressure setting portion sets the instruction pressure of the second electromagnetic valve during release of the sub-clutch to a value at which an input torque input to the second clutch is transmittable and that is lower than the instruction pressure set when the sub-clutch is engaged.

A third aspect of the present invention provides the control device of a vehicle power transmission device recited in the second aspect of the invention, wherein the instruction pressure setting portion does not change the instruction pressure of the second clutch to a reduced pressure side during release of the sub-clutch.

A fourth aspect of the present invention provides the control device of a vehicle power transmission device recited in the third aspect of the invention, wherein the instruction pressure setting portion stores at least two prescribed values as the instruction pressure of the second clutch and sets the prescribed value as the instruction pressure of the second clutch, and wherein the instruction pressure setting portion maintains one of the prescribed values as the instruction pressure while a torque capacity of the second clutch based on the prescribed value set as the instruction pressure is larger than the input torque input to the second clutch, and sets the instruction pressure to another one of the prescribed values at which the input torque is transmittable, when the input torque of the second clutch becomes larger than the torque capacity based on the prescribed value.

A fifth aspect of the present invention provides the control device of a vehicle power transmission device recited in any one of the first to fourth aspects of the invention, wherein the indication pressure setting portion sets the instruction pressure of the second clutch to a preset maximum pressure when an engagement command of the sub-clutch is output.

A sixth aspect of the present invention provides the control device of a vehicle power transmission device recited in any one of the first to fifth aspects of the invention, wherein the fail-safe valve includes a spool valve piece switching a communication state of an oil passage, and wherein in the fail-safe valve, when a predetermined value is exceeded by a sum of an urging force of the spool valve piece based on the hydraulic pressure of the hydraulic fluid supplied to the first clutch or the output pressure of the first electromagnetic valve controlling the hydraulic pressure and the urging force of the spool valve piece based on the hydraulic pressure of the hydraulic fluid supplied to the second clutch or the output pressure of the second electromagnetic valve controlling the hydraulic pressure, the spool valve piece is moved to the fail-safe spool position to interrupt communication between one oil passage that is either an oil passage connected to the first clutch or an oil passage connected to the second clutch and an oil passage supplied with the hydraulic fluid.

A seventh aspect of the present invention provides the control device of a vehicle power transmission device recited in any one of the first to sixth aspects of the invention, wherein the first power transmission path is configured to include a gear mechanism having a predetermined gear ratio, and wherein the second power transmission path is configured to include a belt-type continuously variable transmission.

Advantageous Effects of Invention

According to the control device of the vehicle power transmission device recited in the first aspect of the invention, during release of the sub-clutch, the first power transmission path is interrupted so that the first power transmission path and the second power transmission path are not simultaneously switched to the power transmitting state. Therefore, it is not necessary to retain the hydraulic pressure of the hydraulic fluid supplied to the second clutch at a high pressure during release of the sub-clutch, and thus, by making the instruction pressure of the second electromagnetic valve lower as compared to when the sub-clutch is engaged, the instruction current of the second electromagnetic valve can be lowered to reduce the electric power consumption.

According to the control device of the vehicle power transmission device recited in the second aspect of the invention, the instruction pressure of the second electromagnetic valve during the release of the sub-clutch is set to a value at which the input torque input to the second clutch is transmittable and that is lower than the instruction pressure set when the sub-clutch is engaged, and therefore, the instruction pressure of the second electromagnetic valve becomes lowers within a range in which running is not affected, so that the instruction current of the second electromagnetic valve can be lowered.

According to the control device of the vehicle power transmission device recited in the third aspect of the invention, during release of the sub-clutch, the instruction pressure of the second clutch is not changed to the reduced pressure side, and therefore, the instruction pressure of the second clutch is restrained from fluctuating up and down due to fluctuation of the input torque of the second clutch. Thus, the second clutch can be restrained from deteriorating in durability due to the fluctuation of the instruction pressure of the second clutch.

According to the control device of the vehicle power transmission device recited in the fourth aspect of the invention, while the input torque of the second clutch is smaller than the torque capacity based on the prescribed value set as the instruction pressure, the instruction pressure of the second clutch is maintained at the prescribed value, the instruction pressure of the second clutch is restrained from frequently fluctuating. Therefore, the second clutch can be restrained from deteriorating in durability due to the fluctuation of the instruction pressure of the second clutch.

According to the control device of the vehicle power transmission device of the fifth aspect of the invention, since the first power transmission path and the second power transmission path may simultaneously be switched to the power transmitting state while the sub-clutch is engaged, if the first clutch and the second clutch are supplied with a hydraulic pressure at which engagement or slip engagement is possible, it is desirable to promptly operate the fail-safe valve. Therefore, when the engagement command of the sub-clutch is output, the instruction pressure of the second clutch is set to the maximum value, so that the fail-safe valve can promptly be operated even if the hydraulic pressure of the hydraulic fluid supplied to the first clutch is low.

According to the control device of the vehicle power transmission device of the sixth aspect of the invention, when the predetermined value is exceeded by the sum of the urging force of the spool valve piece based on the hydraulic pressure of the hydraulic fluid supplied to the first clutch or the output pressure of the first electromagnetic valve controlling the hydraulic pressure, and the urging force of the spool valve piece based on the hydraulic pressure of the hydraulic fluid supplied to the second clutch or the output pressure of the second electromagnetic valve controlling the hydraulic pressure, the fail-safe valve moves to the fail-safe spool position, and therefore, by retaining the hydraulic pressure of the hydraulic fluid supplied to the second clutch or the output pressure of the second electromagnetic valve at a high value, the fail-safe valve is promptly operated even if the hydraulic pressure of the hydraulic fluid supplied to the first clutch or the output pressure of the first electromagnetic valve is low. Therefore, it is desirable to retain the instruction pressure of the second clutch or the output pressure of the second electromagnetic valve at a high pressure; however, the first power transmission path and the second power transmission path are not simultaneously switched to the power transmitting state during release of the sub-clutch, so that the instruction pressure of the second clutch or the output pressure of the second electromagnetic valve can be lowered.

According to the control device of the vehicle power transmission device of the seventh aspect of the invention, during running of a vehicle using the second power transmission path, a transmission ratio of the continuously variable transmission is continuously varied, and the input torque input to the second clutch changes at any time according to this transmission ratio. Therefore, the input torque of the second clutch can accurately be calculated based on this transmission ratio.

BRIEF DESCRIPTION OF DRAWINGS

FIG. 1 is a diagram for explaining a schematic configuration of a vehicle to which the present invention is applied.

FIG. 2 is a diagram for explaining switching of running patterns of a power transmission device of FIG. 1 by using an engagement table of engagement elements for each of the running patterns.

MODES FOR CARRYING OUT THE INVENTION

Figure 3:
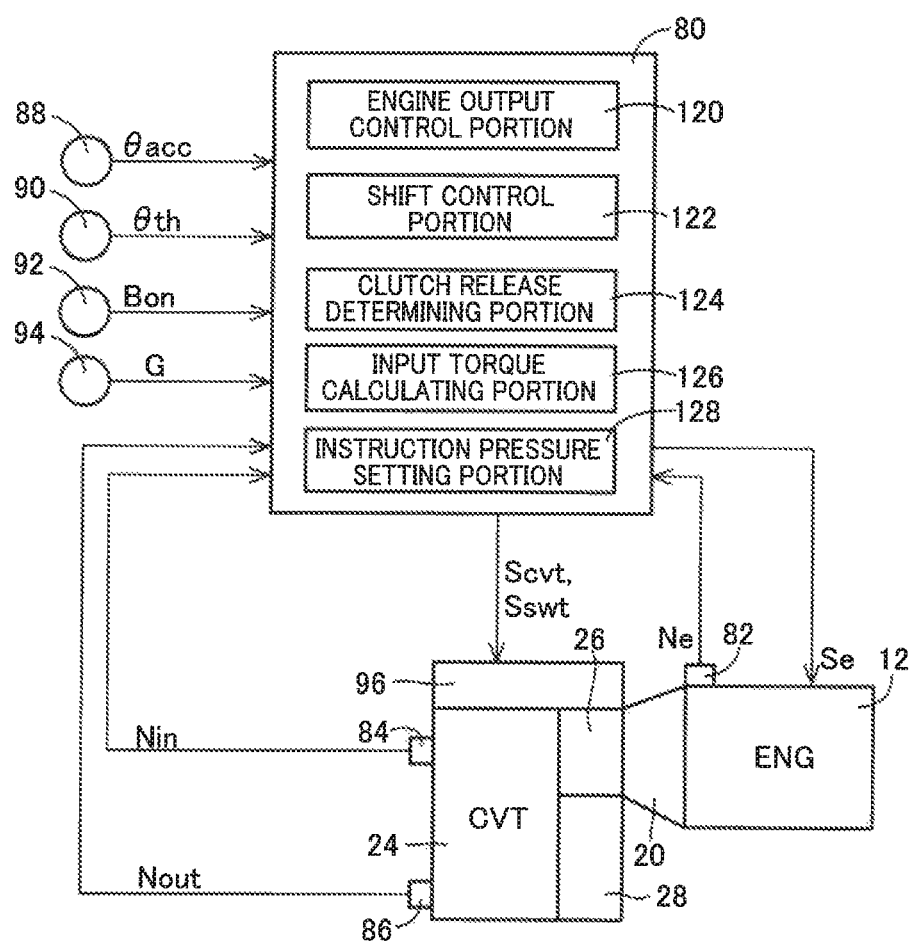
FIG. 3 is a diagram for explaining main portions of a control function and a control system for various controls in the vehicle of FIG. 1.

An example of the present invention will now be described in detail with reference to the drawings. In the following example, the figures are simplified or deformed as needed and portions are not necessarily precisely drawn in terms of dimension ratio, shape, etc.

Example

FIG. 1 is a diagram for explaining a schematic configuration of a vehicle 10 to which the present invention is applied. In FIG. 1, the vehicle 10 includes an engine 12 functioning as a drive power source for running, drive wheels 14, and a vehicle power transmission device 16 (hereinafter referred to as a power transmission device 16) disposed between the engine 12 and the drive wheels 14. The power transmission device 16 includes, in a housing 18 serving as a non-rotating member, a torque converter 20 with a known lockup clutch 19 as a hydraulic transmission device coupled to the engine 12; an input shaft 22 disposed integrally with a turbine shaft that is an output rotating member of the torque converter 20, a known belt-type continuously variable transmission 24 (hereinafter referred to as a continuously variable transmission 24) as a continuously variable transmission mechanism coupled to the input shaft 22, a forward/reverse switching device 26 also coupled to the input shaft 22, a gear mechanism 28 as a transmission mechanism coupled through the forward/reverse switching device 26 to the input shaft 22 and disposed parallel to the continuously variable transmission 24, an output shaft 30 that is an output rotating member common to the continuously variable transmission 24 and the gear mechanism 28, a counter shaft 32, a reduction gear device 34 composed of a pair of gears meshing each other and, disposed on and non-rotatably relative to the output shaft 30 and the counter shaft 32, respectively, a differential gear 38 coupled to a gear 36 disposed relatively non-rotatably on the counter shaft 32, a pair of axles 40 coupled to the differential gear 38, etc. In the power transmission device 16 configured as described above, power of the engine 12 (synonymous with torque and force if not particularly distinguished) is transmitted sequentially through the torque converter 20, the continuously variable transmission 24 (or the forward/reverse switching device 26 and the gear mechanism 28), the reduction gear device 34, the differential gear 38, the axles 40, etc. to a pair of the drive wheels 14.

As described above, the power transmission device 16 includes the continuously variable transmission 24 and the gear mechanism 28 disposed parallel to each other in a power transmission path between the engine 12 (having the same meaning in this case as the input shaft 22 that is an input rotating member to which the power of the engine 12 is transmitted) and the drive wheels 14 (having the same meaning in this case as the output shaft 30 that is the output rotating member outputting the power of the engine 12 to the drive wheels 14). Therefore, the power transmission device 16 includes a first power transmission path PT1 transmitting the power of the engine 12 from the input shaft 22 through the gear mechanism 28 toward the drive wheels 14 (i.e., to the output shaft 30) (i.e., the first power transmission path PT1 configured to include the gear mechanism 28) and a second power transmission path PT2 transmitting the power of the engine 12 from the input shaft 22 through the continuously variable transmission 24 toward the drive wheels 14 (i.e., to the output shaft 30) (i.e., the second power transmission path PT2 configured to include the continuously variable transmission 24) parallel to each other, and is configured such that the first power transmission path PT1 and the second power transmission path PT2 are switched depending on a running state of the vehicle 10. Therefore, for a clutch mechanism selectively switching the first power transmission path PT1 and the second power transmission path PT2, the power transmission device 16 includes a forward clutch C1 and a reverse brake B1 as a clutch mechanism enabling/disenabling the power transmission through the first power transmission path PT1, that is, connecting/disconnecting the first power transmission path PT1, and a CVT running clutch C2 as a clutch mechanism enabling/disenabling the power transmission through the second power transmission path PT2, that is, connecting/disconnecting the second power transmission path PT2. The forward clutch C1, the CVT running clutch C2, and the reverse brake B1 correspond to a connecting/disconnecting device and are ail known hydraulic friction engagement devices (friction clutches) frictionally engaged by hydraulic actuators. The forward clutch C1 and the reverse brake B1 are each one of elements constituting the forward/reverse switching device 26 as described later. The forward clutch C1 corresponds to a first clutch of the present invention and the CVT running clinch C2 corresponds to a second clutch of the present invention.

The forward/reverse switching device 26 is disposed around the input shaft 22 coaxially with the input shaft 22 and is mainly made up of a double pinion type planetary gear device 26p, the forward clutch C1, and the reverse brake B1. A carrier 26c of the planetary gear device 26p is integrally coupled to the input shaft 22; a ring gear 26r of the planetary gear device 26p is selectively coupled through the reverse brake B1 to the housing 18; and a sun gear 26s of the planetary gear device 26p is coupled to a small-diameter gear 42 disposed relatively rotatably around the input shaft 22 and coaxially with the input shaft 22. The carrier 26c and the sun gear 26s are selectively coupled through the forward clutch C1. In the forward/reverse switching device 26 configured as described above, when the forward clutch C1 is engaged and the reverse brake B1 is released, the input shaft 22 is directly coupled to the small-diameter gear 42, and a forward power transmission path is established in the first power transmission path PT1. When the reverse brake B1 is engaged and the forward clutch C1 is released, the small-diameter gear 42 is rotated with respect to the input shaft 22 in the opposite direction relative to when the forward clutch C1 is engaged, and a reverse power transmission path is established in the first power transmission path PT1. When both the forward clutch C1 and the reverse brake B1 are released, the first power transmission path PT1 is put into a neutral state (power transmission interrupted state) in which the power transmission is interrupted.

The gear mechanism 28 is configured to include the small-diameter gear 42 and a large-diameter gear 46 disposed relatively non-rotatably on a gear mechanism counter shaft 44 and meshed with the small-diameter gear 42. Therefore, the gear mechanism 28 is a transmission mechanism in which one gear position (gear ratio) is formed. Around the gear mechanism counter shaft 44, an idler gear 48 is disposed coaxially and relatively rotatably with respect to the gear mechanism counter shaft 44. Around the gear mechanism counter shaft 44, a dog clutch D1 selectively connecting/disconnecting the gear mechanism counter shaft 44 to/from the idler gear 48 is disposed therebetween. Therefore, the dog clutch D1 functions as a clutch mechanism included in the power transmission device 16 and enabling/disenabling the power transmission through the first power transmission path PT1, that is, connecting/disconnecting the first power transmission path PT1. The dog clutch D1 corresponds to a sub-clutch of the present invention.

Specifically, the dog clutch D1 includes a first gear 50 formed on the gear mechanism counter shaft 44, a second gear 52 formed on the idler gear 48, and a hub sleeve 54 provided with inner circumferential teeth that can be fitted (engaged, meshed) to the first gear 50 and the second gear 52. In the dog clutch D1 configured as described above, the hub sleeve 54 is fitted to the first gear 50 and the second gear 52 to connect the gear mechanism counter shaft 44 and the idler gear 48. The dog clutch D1 further includes a known synchromesh mechanism S1 as a synchronizing mechanism synchronizing rotation speeds when the first gear 50 and the second gear 52 are fitted. The idler gear 48 is meshed with an output gear 56 having a diameter larger than the idler gear 48. The output gear 56 is disposed around the same rotation axis as the output shaft 30 and relatively non-rotatably with respect to the output shaft 30. When one of the forward clutch C1 and the reverse brake B1 is engaged and the dog clutch D1 is engaged, the first power transmission path PT1 is established such that the power of the engine 12 is transmitted from the input shaft 22 sequentially through the forward/reverse switching device 26, the gear mechanism 28, the idler gear 48, and the output gear 56 to the output shaft 30. Therefore, when one of the forward clutch C1 and the reverse brake B1 as well as the dog clutch D1 are engaged, the first power transmission path PT1 is in a power transmittable state.

The continuously variable transmission 24 is disposed on a power transmission path between the input shaft 22 and the output shaft 30. The continuously variable transmission 24 includes a primary pulley 58 disposed on the input shaft 22 and having a variable effective diameter, a secondary pulley 62 disposed on a rotating shaft 60 coaxial with the output shaft 30 and having a variable effective diameter, and a transmission belt 64 wound between the paired variable pulleys 58, 62 and is a well-known push-type continuously variable transmission transmitting power through a frictional force between the pair of the variable pulleys 58, 62 and the transmission belt 64.

The primary pulley 58 includes a fixed sheave 58a as an input-side fixed rotating body coaxially attached to the input shaft 22, a movable sheave 58b as an input-side movable rotating body disposed relatively non-rotatably with respect to the input shaft 22 and movably in the axial direction, and a primary-side hydraulic actuator 58c (hereinafter referred to as a hydraulic actuator 58c) generating a thrust force for moving the movable sheave 58b to change a V groove width between the fixed sheave 58a and the movable sheave 58b.

The secondary pulley 62 is configured to include a fixed sheave 62a as an output-side fixed rotating body, a movable sheave 62b as an output-side movable rotating body disposed relatively non-rotatably around the axis with respect to the fixed sheave 62a and movably in the axial direction, and a secondary-side hydraulic actuator 62c (hereinafter referred to as a hydraulic actuator 62c) generating a thrust force for moving the movable sheave 62b to change a V groove width therebetween.

The continuously variable transmission 24 has a transmission ratio (gear ratio) γ (=input shaft rotation speed Nin/output shaft rotation speed Nout) continuously changed by changing the V groove width of the pair of the variable pulleys 58, 62 to vary a winding diameter (effective diameter) of the transmission belt 64. For example, when the V groove width of the primary pulley 58 is narrowed, the gear ratio γ is reduced (i.e., the continuously variable transmission 24 is upshifted). When the V groove width of the primary pulley 58 is widened, the gear ratio γ is increased (i.e., the continuously variable transmission 24 is downshifted). The output shaft 30 is disposed around the rotating shaft 60 coaxially and relatively non-rotatably with respect to the rotating shaft 60. The CVT running clutch C2 is disposed closer than the continuously variable transmission 24 to the drive wheels 14 (i.e., disposed between the secondary pulley 62 and the drive wheels 14 (the output shaft 30)) to selectively connect/disconnect the secondary pulley 62 to/from the output shaft 30 (the drive wheels 14). When this CVT running clutch C2 is engaged, the second power transmission path PT2 is established such that the power of the engine 12 is transmitted from the input shaft 22 through the continuously variable transmission 24 to the output shaft 30. Therefore, when the CVT running clutch C2 is engaged, the second power transmission path PT2 is in a power transmittable state.

The operation of the power transmission device 16 will hereinafter be described. FIG. 2 is a diagram for explaining switching of running patterns (modes) by using an engagement table of engagement elements of the power transmission device 16 for each of the running patterns. Each column C1 in FIG. 2 denotes the operation state of the forward clutch C1, each column C2 in FIG. 2 denotes the operation state of the CVT running clutch C2, each column. B1 in FIG. 2 denotes the operation state of the reverse brake B1, each column D1 in FIG. 2 denotes the operation state of the dog clutch D1, "o" indicative of engagement (connection), and "x" indicative of release (interruption).

First, description will be made of a gear running mode that is a running pattern in which the power of the engine 12 is transmitted through the gear mechanism 28 to the output shaft 30 (i.e., a running pattern in which power is transmitted through the first power transmission path PT1). In this gear running mode, as shown in FIG. 2, for example, the forward clutch C1 and the dog clutch D1 are engaged, while the CVT running clutch C2 and the reverse brake B1 are released.

Specifically, when the forward clutch C1 is engaged, the planetary gear device 26p constituting the forward/reverse switching device 26 is integrally rotated, so that the small-diameter gear 42 is rotated at the same rotation speed as the input shaft 22. Additionally, since the small-diameter gear 42 is meshed with the large-diameter gear 46 disposed on the gear mechanism counter shaft 44, the gear mechanism counter shaft 44 is also rotated together with the large-diameter gear 46. Furthermore, since the dog clutch D1 is engaged, the gear mechanism counter shaft 44 and the idler gear 48 are connected. Since the idler gear 48 is meshed with the output gear 56, the output shaft 30 disposed integrally with the output gear 56 is rotated. In this way, when the forward clutch C1 and the dog clutch D1 are engaged, the power of the engine 12 is transmitted sequentially through the torque converter 20, the forward/reverse switching device 26, the gear mechanism 28, the idler gear 48, etc. to the output shaft 30. In this gear running mode, for example, when the reverse brake B1 and the dog clutch D1 are engaged while the CVT running clutch C2 and the forward clutch C1 are released, reverse running of the vehicle 10 is performed.

Description will be made of a CVT running mode that is a running pattern in which the power of the engine 12 is transmitted through the continuously variable transmission 24 to the output shaft 30 (i.e., a running pattern in which power is transmitted through the second power transmission path PT2). In this CVT running mode, as shown in a CVT running (high vehicle speed) mode of FIG. 2, for example, the CVT running clutch C2 is engaged, while the forward clutch C1, the reverse brake B1, and the dog clutch D1 are released.

Specifically, when the CVT running clutch C2 is engaged, the secondary pulley 62 and the output shaft 30 are connected, so that the secondary pulley 62 and the output shaft 30 are integrally rotated. In this way, when the CVT running clutch C2 is engaged, the power of the engine 12 is transmitted sequentially through the torque converter 20, the continuously variable transmission 24, etc. to the output shaft 30. The dog clutch D1 is released during this CVT running (high vehicle speed) mode so as to eliminate dragging of the gear mechanism 28 etc. during the CVT running mode and prevent high rotation of the gear mechanism 28 etc. at high vehicle speed, for example.

The gear running mode is selected in a low vehicle speed region including during stop of the vehicle, for example. A gear ratio γ1 in the first power transmission path PT1 (i.e., a gear ratio EL established by the gear mechanism 28) is set to a larger value (i.e., a gear ratio on the lower side) than the maximum gear ratio established by the continuously variable transmission 24 (i.e., the lowest gear ratio that is the gear ratio on the lowest vehicle speed side) γmax. For example, the gear ratio γ1 corresponds to a first-speed gear ratio γ1 that is a gear ratio of a first-speed gear position in the power transmission device 16, and the lowest gear ratio γmax of the continuously variable transmission 24 corresponds to a second-speed gear ratio γ2 that is a gear ratio of a second-speed gear position in the power transmission device 16. Therefore, for example, the gear running mode and the CVT running mode are switched according to a shift line for switching between the first-speed gear position and the second-speed gear position in a known shift map of a multi-speed transmission. For example, in a CVT running mode, a Shift (e.g., CVT shift, continuously variable shift) is performed such that the gear ratio γ is changed based on a running state of the vehicle 10 such as an accelerator opening degree θacc and a vehicle speed V by using a known method. When switching is performed from the gear running mode to the CVT running (high vehicle speed) mode or from the CVT running (high vehicle speed) mode to the gear running mode, as shown in FIG. 2, the switching is performed transiently through a CVT running (medium vehicle speed) mode.

For example, when switching is performed from the gear running mode to the CVT running (high vehicle speed) mode, switching is transiently performed from a state corresponding to the gear running mode in which the forward clutch C1 and the dog clutch D1 are engaged, to the CVT running (medium vehicle speed) mode that is a state in which the CVT running clutch C2 and the dog clutch D1 are engaged. Specifically, a shift by changing operation states of the clutches (e.g., a clutch-to-clutch shift (hereinafter referred to as a C-to-C shift)) is executed such that the forward clutch C1 is released while the CVT running clutch C2 is engaged. In this case, the power transmission path is changed from the first power transmission path PT1 to the second power transmission path PT2, and the power transmission device 16 is substantially upshifted. After the power transmission path is switched, the dog clutch is released to prevent unnecessary dragging and high rotation of the gear mechanism 28 (see driven input interruption of FIG. 2). In this way, the dog clutch D1 functions as a driven input interruption clutch interrupting the input from the drive wheels 14 side.

For example, if switching is performed from the CVT miming (high vehicle speed) mode to the gear running mode, switching is transiently performed from a state in which the CVT running clutch C2 is engaged, to the CVT running (medium vehicle speed) mode that is a state in which the dog clutch D1 is further engaged, for preparation of switching to the gear running mode (see downshift preparation of FIG. 2). In this CVT running (medium vehicle speed) mode, rotation is also transmitted through the gear mechanism 28 to the sun gear 26s of the planetary gear device 26p. When a shift by changing the operation state of the clutches (e.g., a C-to-C shift) is executed from the CVT running (medium vehicle speed) mode such that the CVT running clutch C2 is released while the forward clutch C1 is engaged, switching to the gear running mode is achieved. In this case, the power transmission path is changed from the second power transmission path PT2 to the first power transmission path and the power transmission device 16 is substantially downshifted.

FIG. 3 is a diagram for explaining main portions of a control function and a control system for various controls in the vehicle 10. In FIG. 3, the vehicle 10 includes an electronic control device 80 including a control device of the vehicle 10 for switching the running pattern of the power transmission device 16, for example. Therefore, FIG. 3 is a diagram of an input/output system of the electronic control device 80 and is a functional block diagram for explaining the main portion of the control function by the electronic control device 80. The electronic control device 80 is configured to include, for example, a so-called microcomputer including a CPU, a RAM, a ROM, an I/O interface, etc., and the CPU executes a signal process according to a program stored in advance in the ROM, while utilizing a temporary storage function of the RAM to provide the various controls of the vehicle 10. For example, the electronic control device 80 provides an output control of the engine 12, a shift control and a belt clamping pressure control of the continuously variable transmission 24, and a switching control of switching the running pattern to the CVT miming mode or the gear running mode and is configured separately for the engine control, the shift control, etc., as necessary.

The electronic control device 80 is supplied with each of various actual values (e.g., an engine rotation speed Ne, an input shaft rotation speed NM that is a turbine rotation speed of the primary pulley 58 corresponding to a turbine rotation speed Nt, an output shaft rotation speed Nout that is a rotation speed of the secondary pulley 62 corresponding to the vehicle speed V, an accelerator opening degree θacc that is an operation amount of an accelerator pedal considered as an acceleration request amount of a driver, a throttle valve opening degree θth, a brake-on Bon that is a signal indicative of an operated state of a foot brake serving as a service brake, and a longitudinal acceleration G of the vehicle 10) based on detection signals from various sensors included in the vehicle 10 (e.g., an engine rotation speed sensor 82, an input shaft rotation speed sensor 84, an output shaft rotation speed sensor 86, an accelerator opening degree sensor 88, a throttle valve opening degree sensor 90, a brake switch 92, and a G sensor 94).

The electronic control device 80 outputs an engine output control command signal Se for the output control of the engine 12, a hydraulic control command signal Scvt for hydraulic control related to the shift of the continuously variable transmission 24, a hydraulic control command signal Sswt for controlling the forward/reverse switching device 26, the CVT running clutch C2, and the dog clutch D1 related to the switching of the running pattern of the power transmission device 16, etc.

Specifically, signals output as the engine output control command signal Se include a throttle signal for driving a throttle actuator to control opening/closing of an electronic throttle valve, an injection signal for controlling an amount of fuel injected from a fuel injection device, an ignition timing signal for controlling the tithing of ignition of the engine 12 by an ignition device, etc.

Signals output as the hydraulic control command signal Scvt to a hydraulic control circuit 96 include a command signal for driving an electromagnetic valve (solenoid valve) for adjusting a primary pressure Pin supplied to the hydraulic actuator 58c of the primary pulley 58, a command signal for driving an electromagnetic valve (solenoid valve) for adjusting a secondary pressure Pout supplied to the hydraulic actuator 62c of the secondary pulley 62, etc.

Signals output as the hydraulic control command signal Sswt to the hydraulic control circuit 96 include command signals for driving electromagnetic valves (solenoid valves) controlling hydraulic pressures supplied to actuators operating the forward clutch C1, the reverse brake B1, the CVT running clutch C2, and the hub sleeve 54.

Figure 4:
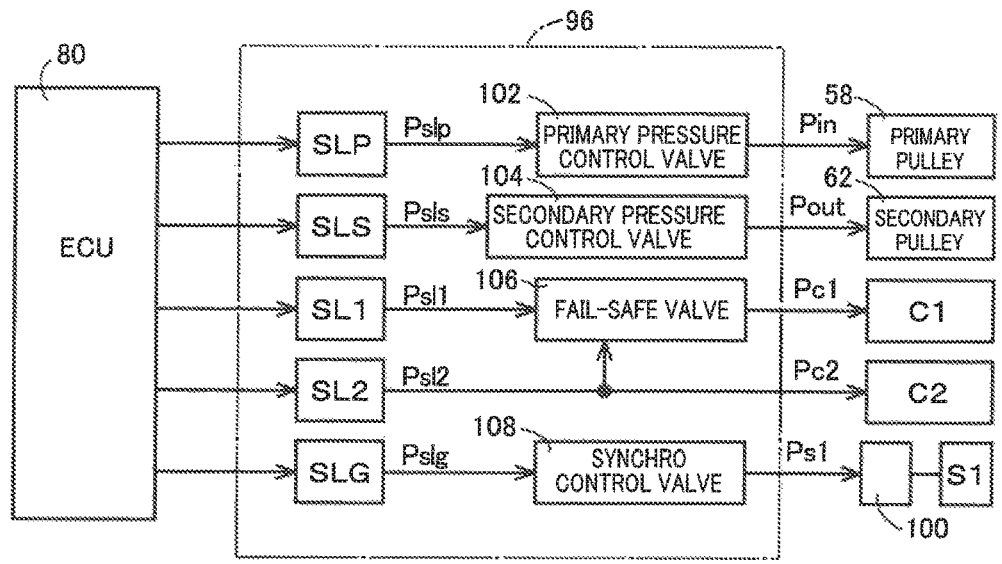
FIG. 4 is a diagram for generally explaining portions controlling a hydraulic pressure related to a continuously variable transmission, a forward clutch, a CVT running clutch, and a dog clutch, in a hydraulic control circuit included in the power transmission device of FIG. 1.

FIG. 4 is a diagram for generally explaining portions controlling the hydraulic pressure related to the continuously variable transmission 24, the forward clutch C1, the CVT running clutch C2, and the dog clutch D1, in the hydraulic control circuit 96 included in the power transmission device 16.

The hydraulic control circuit 96 includes a primary electromagnetic valve SLP for controlling the primary pressure Pin supplied to the primary pulley 58, a secondary electromagnetic valve SLS for controlling the secondary pressure Pout supplied to the secondary pulley 62, a C1 electromagnetic valve SL1 for controlling a C1 pressure Pc1 supplied to the forward clutch C1, a C2 electromagnetic valve SL2 for controlling a C2 pressure Pc2 supplied to the CVT running clutch C2, and a synchro electromagnetic valve SLG for controlling a synchro control pressure Ps1 supplied to a hydraulic actuator 100 operating the synchromesh mechanism S1. The hydraulic control circuit 96 includes a primary pressure control valve 102, a secondary pressure control valve 104, a fail-safe valve 106, and a synchro control valve 108. The C1 electromagnetic valve SL1 corresponds to a first electromagnetic valve of the present invention and the C2 electromagnetic valve SL2 corresponds to a second electromagnetic valve of the present invention.

The electromagnetic valves SLP, SLS, SL1, SL2, SLG are all linear solenoid valves (electromagnetic valves) driven by a hydraulic control command signal (instruction current) output from the electronic control device 80. The primary pressure control valve 102 is operated based on an SLP pressure Pslp output from the primary electromagnetic valve SLP, thereby regulating the primary pressure Pin. The secondary pressure control valve 104 is operated based on an SLS pressure Psls output from the secondary electromagnetic valve SLS, thereby regulating the secondary pressure Pout. The synchro control valve 108 is operated based on an SLG pressure Pslg output from the synchro electromagnetic valve SLG, thereby regulating the synchro control pressure Ps1. The fail-safe valve 106 selectively communicates and interrupts an oil passage through which an SL1 pressure Psl1 output from the C1 electromagnetic valve SL1 is supplied as the C1 pressure Pc1 to the forward clutch C1. The fail-safe valve 106 functions as a fail-safe valve preventing simultaneous engagement of the forward clutch C1 and the CVT running clutch C2 by interrupting the oil passage through which the C1 pressure Pc1 (having the same meaning as the SL1 pressure Psl1) to the forward clutch C1. An SL2 pressure Psl2 output from the C2 electromagnetic valve SL2 is directly supplied as the C2 pressure Pc2 to the CVT running clutch C2. In this example, the electromagnetic valves SLP, SLS, SL1, SL2, SLG are all configured to output a hydraulic pressure proportional to the instruction current.

Figure 5:
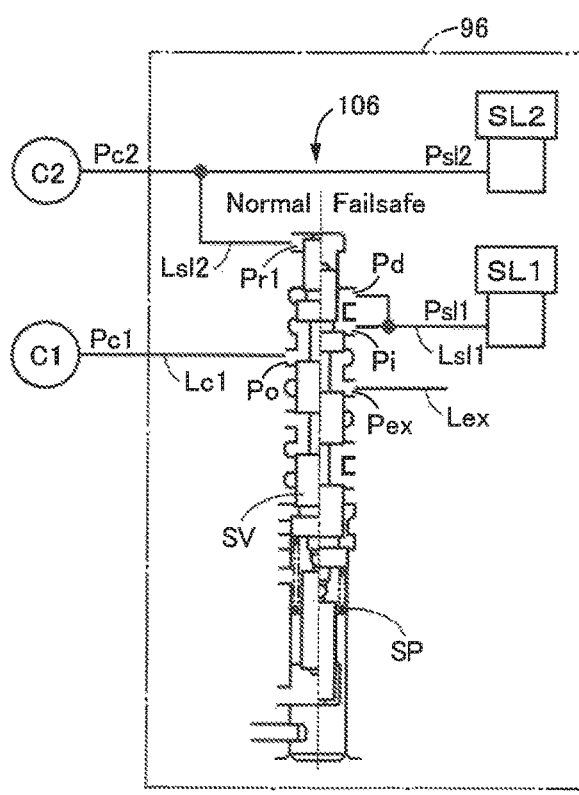
FIG. 5 is a diagram for explaining a configuration of the fail-safe valve shown in FIG. 4.

FIG. 5 is a diagram for explaining a configuration of the fail-safe valve 106. In FIG. 5, the fail-safe valve 106 includes a spring SP, an input port Pi, an exhaust port Pex, an output port Po selectively communicating with the input port Pi and the exhaust port Pex, a differential port Pd at which there is a difference in effective diameters between either end of the spool valve piece SV, a first oil chamber Pr1, and a spool valve piece SV for switching communication states of oil passages. The fail-safe valve 106 includes the spool valve piece SV housed slidably at a predetermined movement stroke and constantly urged in one direction by the spring SP in a valve body, and the communication states of the oil passages are switched according to the movement of the spool valve piece SV to one end and the other end of the stroke, so as to allow communication between the input port Pi and the output port Po or allow communication between the exhaust port Pex and the output port Po.

An oil passage Lsl1 supplied with the SL1 pressure Psl1 from the C1 electromagnetic valve SL1 is connected to the input port Pi and the differential port Pd. An exhaust oil passage Lex is connected to the exhaust port Pex. An oil passage Lc1 communicating with the forward clutch C1 is connected to the output port Po. An oil passage Lsl2 supplied with the SL2 pressure Psl2 from the C2 electromagnetic valve SL2 is connected to the first oil chamber Pr1. The fail-safe valve 106 configured in this way is selectively switched to a normal spool position (valve state) (Normal) at which the oil passage Lsl1 and the oil passage Lc1 communicate with each other and a fail-safe spool position (valve state) (Failsafe) at which the exhaust oil passage Lex and the oil passage Lc1 communicate with each other, based on the SL1 pressure Psl1 (having the same meaning as the C1 pressure Pc1 of the hydraulic fluid supplied to the forward clutch C1) and the SL2 pressure Psl2 (having the same meaning as the C2 pressure Pc2 of the hydraulic fluid supplied to the CVT running clutch C2), thereby preventing the simultaneous engagement of the forward clutch C1 and the CVT running clutch C2.

In the fail-safe valve 106, the spring SP generates an urging force Fsp to hold the spool valve piece SV at the normal spool position (Normal). The SL1 pressure Psl1 and the SL2 pressure Psl2 generate an urging force F1 and F2, respectively for moving the spool valve piece SV to the fail-safe spool position (Failsafe) against the urging force Fsp of the spring SP. Therefore, the fail-safe valve 106 is switched by the SL1 pressure Psl1 and the SL2 pressure Psl2 to the fail-safe spool position (Failsafe) at Which the simultaneous engagement is prevented.

In the fail-safe valve 106, when the urging force Fsp moving the spool valve piece SV to the normal spool position (Normal) generated from the spring SP is larger than a sum (=F1+F2) of an urging force F1 (=Psl1*S1) and an urging force F2 (=Psl2*S2), where the urging force F1 moves the spool valve piece SV to the fail-safe spool position (Failsafe) and is defined based on the SL1 pressure Psl1 supplied to the forward clutch C1 and a pressure receiving area S1 in the differential port Pd and the urging force F2 (=Psl2*S2) moves the spool valve piece SV to the fail-safe spool position (Failsafe) and is defined based on the SL2 pressure Psl2 supplied to the CVT running clutch C2 and a pressure receiving area S2 in the first oil chamber Pr1, the spool valve piece SV is moved to the normal spool position (Normal).

On the other hand, when the sum (=F1+F2) of the urging forces F1 and F2 exceeds the urging force Fsp (corresponding to a predetermined value of the present invention), the spool valve piece SV is moved to the fail-safe spool position (Failsafe).

For example, when an ON failure of the C1 electromagnetic valve SL1 or the C2 electromagnetic valve SL2 causes the output of the SL1 pressure Psl1 of the C1 electromagnetic valve SL1 and the output of the SL2 pressure Psl2 of the C2 electromagnetic valve SL2 to occur at the same time so that the urging force (F1+F2) based on the SL1 pressure Psl1 and the SL2 pressure Psl2 becomes larger than the urging force Fsp generated from the spring SP, the spool valve piece SV is moved to the fail-safe spool position (Failsafe). In other words, the fail-safe valve 106 is switched to the fail-safe side. In this case, the communication is interrupted between the oil passage Lc1 connected to the forward clutch C1 and the oil passage Lsl1 supplied with the SL1 pressure Psl1, and the oil passage Lc1 is connected to the exhaust oil passage Lex so that the forward clutch C1 is not supplied with the C1 pressure Pc1 (i.e., the SL1 pressure Psl1) and the forward clutch C1 is released, and therefore, the first power transmission path PT1 is put into the power transmission interrupted state. Therefore, the simultaneous engagement of the forward clutch C1 and the CVT running clutch C2 is prevented, so that a tie-up of the power transmission device 16 is prevented from occurring due to the formation of both the first power transmission path PT1 and the second power transmission path PT2. The failsafe valve 106 is set such that even when a maximum pressure Psl1m defined as a predetermined value and defined as the instruction pressure Psl1i of the SL1 pressure Psl1 is output, the valve is not switched to the fail-safe spool position unless the SL2 pressure Psl2 is output, and that even when a maximum pressure Psl2m defined as a predetermined value and defined as the instruction pressure Psl2i of the SL2 pressure Psl2 is output, the valve is not switched to the fail-safe spool position unless the SL1 pressure Psl1 is output.

Returning to FIG. 3, the electronic control device 80 functionally includes an engine output control portion 120 (engine output control means) and a shift control portion 122 (shift control means).

For example, for the output control of the engine 12, the engine output control portion 120 outputs the engine output control command signal Se to each of the throttle actuator, the fuel injection device, and the ignition device. The engine output control portion 120 calculates a required drive output Pdem as a drive request amount from a driver based on the actual accelerator opening degree θacc and the vehicle speed V from a predetermined relationship (drive power map) not shown, for example, sets a target engine torque Tetgt for obtaining the required drive output Pdem, and provides the opening/closing control of the electronic throttle valve with the throttle actuator, as well as the control of the fuel injection amount with the fuel injection device and the control of the ignition timing with the ignition device, so as to obtain the target engine torque Tetgt.

In the CVT running mode, the shiftcontrol portion 122 outputs to the hydraulic control circuit 96 the hydraulic control command signal Scvt controlling the transmission ratio γ of the continuously variable transmission 24 to achieve a target transmission ratio (target gear ratio) γtgt calculated based on the accelerator opening degree θacc, the vehicle speed V, the brake signal Bon, etc. Specifically, the shift control portion 122 has a predefined relationship (e.g., a CVT shift map) stored therein for achieving the target gear ratio γtgt of the continuously variable transmission 24 at which an operating point of the engine 12 is on a predetermined optimum line (e.g., an engine optimum fuel consumption line) while adjusting the bell clamping pressure of the continuously variable transmission 24 to an optimum value, determines from the relationship based on the accelerator opening degree θacc, the vehicle speed V, etc., a primary instruction pressure Pintgt as a command value of the primary pressure Pin supplied to the hydraulic actuator 58c and a secondary instruction pressure Pouttgt as a command value of the secondary pressure Pout supplied to the hydraulic actuator 62c, and outputs the primary instruction pressure Pintgt and the secondary instruction pressure Pouttgt to the hydraulic control circuit 96 to perform the CVT shift.

The shift control portion 122 provides the switching control of switching between the gear running mode in which the power of the engine 12 is transmitted through the gear mechanism 28 to the output shaft 30 and the CVT running mode in which the power of the engine 12 is transmitted through the continuously variable transmission 24 to the output shaft 30. Specifically, the shift control portion 122 determines whether to switch the running pattern during running of the vehicle. For example, the shift control portion 122 uses an upshift line and a downshift line of the shift map for switching between the first-speed gear ratio γ1 corresponding to the gear ratio EL in the gear running mode and the second-speed gear ratio γ2 corresponding to the lowest gear ratio γmax in the CVT running mode to make a judgement on a shift (switching of a gear ratio) based on the vehicle speed V and the accelerator opening degree θacc and determines whether to switch the running pattern during running of the vehicle, based on the judgment result. The upshift line and the downshift line are predetermined shift lines and have predetermined hysteresis.

When the shift control portion 122 determines to switch the running pattern, the shift control portion 122 switches the running pattern. For example, when the shift control portion 122 determines to upshift during the gear running mode, the shift control portion 122 switches from the gear running mode to the CVT running (high vehicle speed) mode. When the shift control portion 122 switches the running pattern from the gear running mode to the CVT running (high vehicle speed) mode, the shift control portion 122 first performs an upshift through a C-to-C shift of releasing the forward clutch C1 and engaging the CVT running clutch C2. This state corresponds to the transiently switched CVT running (medium vehicle speed) mode of FIG. 2, and the power transmission path in the power transmission device 16 is switched from the first power transmission path PT1 in which the power is transmitted through the gear mechanism 28 to the second power transmission path PT2 in which the power is transmitted through the continuously variable transmission 24. Subsequently; the shift control portion 122 outputs a command to operate the hub sleeve 54 of the synchromesh mechanism S1 to release the engaged dog clutch D1 for switching to the CVT running (high vehicle speed) mode. The hub sleeve 54 is driven by a hydraulic actuator not shown, and pressing force to the hub sleeve 54 is adjusted by a hydraulic pressure supplied to the hydraulic actuator.

When the shift control portion 122 determines to downshift during the CVT running (high vehicle speed) mode, the shift control portion 122 switches from the CVT running (high vehicle speed) mode to the gear running mode. When the shift control portion 122 switches the running pattern from the CVT running (high vehicle speed) mode to the gear running mode, the shift control portion 122 first outputs a command to operate the hub sleeve 54 of the synchromesh mechanist S1 to engage the released dog clutch D1 for switching to the CVT running (medium vehicle speed) mode. Subsequently, the shift control portion 122 performs a downshift through a C-to-C shift of releasing the CVT running clutch C2 and engaging the forward clutch C1. This state corresponds to the gear running mode in FIG. 2, and the power transmission path in the power transmission device 16 is switched from the second power transmission path PT2 in which the power is transmitted through the continuously variable transmission 24 to the first power transmission path PT1 in which the power is transmitted through the gear mechanism 28. In this way, when the shift control portion 122 switches the running pattern from the power transmission via the continuously variable transmission 24 to the power transmission via the gear mechanism 28 while the vehicle 10 is running, the shift control portion 122 engages the dog clutch D1 before releasing the CVT running clutch C2.

When the SL1 pressure Psl1 and the SL2 pressure Psl2 are output at the same time, it is desirable that the fail-safe valve 106 for preventing the simultaneous engagement of the forward clutch C1 and the CVT running clutch C2 is promptly operated (switched to the fail-safe spool position). Therefore, conventionally, an instruction current Isl2 of the C2 electromagnetic valve SL2 is set during the CVT running mode such that the SL2 pressure Psl2 reaches the maximum pressure Psl2$m$ defined as a predetermined value.

Specifically, during the CVT running mode, the instruction current Isl2 of the C2 electromagnetic valve SL2 is set such that, for example, a line pressure PL is output as the maximum pressure Psl2$m$ from the C2 electromagnetic valve SL2. The C2 electromagnetic valve SL2 is configured such that the SL2 pressure Psl2 to be output becomes higher in proportion to the instruction current Isl2 and that the line pressure PL is output from the C2 electromagnetic valve SL2 when the instruction current Isl2 becomes equal to or greater than a predetermined value. During the CVT running mode, the instruction current Isl2 of the C2 electromagnetic valve SL2 is set to a value equal to or greater than the predetermined value, so that the line pressure PL is output as the maximum pressure Psl2$m$ from the C2 electromagnetic valve SL2 and, when the SL1 pressure Psl1 is output from the C1 electromagnetic valve SL1 in this state, the fail-safe valve 106 is promptly switched to the fail-safe spool position. The line pressure PL is supplied as a source pressure to the C2 electromagnetic valve SL2, and the line pressure PL is adjusted based on the SLS pressure Psls from the secondary electromagnetic valve SLS or the SLP pressure Pslp from the primary electromagnetic valve SLP, for example.

Since the maximum pressure Psl2$m$ is constantly output from the C2 electromagnetic valve SL2 during the CVT running mode in this way, the instruction current Isl2 of the C2 electromagnetic valve SL2 becomes higher and electric power consumption is increased, which causes a deterioration in fuel consumption. In this example, the instruction current Isl2 of the C2 electromagnetic valve SL2 is lowered during the CVT running mode by executing a control described later, thus the electric power consumption can be reduced.

The electronic control device 80 functionally includes a clutch release determining portion 124 (clutch release determining means), an input torque calculating portion 126 (input torque calculating means), and an instruction pressure setting portion 128 (instruction pressure setting means) for providing the control of reducing the electric power consumption.

The clutch release determining portion 124 determines whether the dog clutch D1 is in a released state during the CVT running mode. The clutch release determining portion 124 determines whether the dog clutch D1 is in the released state, based on whether an instruction current Islg of the synchro electromagnetic valve SLG is within a predetermined range causing the dog clutch D1 to be in the released state, for example. In this example, the predetermined range of the instruction current Islg causing the dog clutch D1 to be in the released state is from zero to a value near zero.

When it is determined that the dog clutch D1 is released, the input torque calculating portion 126 calculates an input torque Tinc2 input to the CVT running clutch C2. The input torque calculating portion 126 calculates the input torque Tinc2 based on an engine torque Te and the gear ratio $\gamma$ of the continuously variable transmission 24. The input torque calculating portion 126 calculates the input torque Tinc2 based on the following Eq. (1). In the Eq. (1), Te represents the engine torque, and $\gamma$ represents the transmission ratio (gear ratio) of the continuously variable transmission 24. The Eq. (1) is applied when the lockup clutch 19 disposed in the torque converter 20 is engaged, and torque ratio of the torque converter 20 is also taken into consideration if the lockup clutch 19 is released.

$$Tinc2 = Te * \gamma \quad (1)$$

The engine torque Te is obtained, for example, by applying the throttle opening degree $\theta$th (or the accelerator opening degree $\theta$acc) and the engine rotation speed Ne detected as needed to a preset relation map or relational expression for obtaining the engine torque Te constituted by the throttle opening degree $\theta$th (or the accelerator opening degree $\theta$acc) and the engine rotation speed Ne. The transmission ratio $\gamma$ of the continuously variable transmission 24 is calculated as needed by the following Eq. (2).

$$\gamma = Nin/Nout \quad (2)$$

The instruction pressure setting portion 128 sets an instruction pressure Psl2*i* of the SL2 pressure Psl2 output from the C2 electromagnetic valve SL2 during release of the dog clutch D1 based on the input torque Tinc2 of the CVT running clutch C2 calculated as needed. Specifically, the instruction pressure setting portion 128 makes the instruction pressure Psl2*i* of the C2 electromagnetic valve SL2 during release of the dog clutch D1 lower as compared to the instruction pressure Psl2*i* set when the input torque Tinc2 of the CVT running clutch C2 is transmittable and the dog clutch D1 is engaged (during engagement). The input torque Tinc2 being transmittable means that the CVT running clutch C2 is maintained in the engaged state without a slip (excluding a minute slip) during the power transmission of the CVT running clutch C2. When the dog clutch D1 is engaged (during engagement), the instruction pressure Psl2*i* is set to the maximum pressure Psl2*m* defined as a predetermined value (e.g., the line pressure PL).

The instruction pressure setting portion 128 calculates a torque capacity Tc2 of the CVT running clutch C2 required during the CVT running mode from the following Eq. (3). In the Eq. (3), SF corresponds to a safety factor and is set to a value larger than 1.0. Therefore, the torque capacity Tc2 is a value larger than the input torque Tinc2. After the instruction pressure setting portion 128 calculates the torque capacity Tc2, the instruction pressure setting portion 128 converts the torque capacity Tc2 into the SL2 pressure Psl2 of the CVT running clutch C2 according to a known relationship obtained based on design and sets the obtained SL2 pressure Psl2 as the instruction pressure Psl2*i*. Since the torque capacity Tc2 of the CVT running clutch C2 based on the instruction pressure Psl2*i* set in this way has a value larger than the input torque Tinc2 of the CVT running clutch C2, the input torque Tinc2 is transmittable. Therefore, the engaged state of the CVT running clutch C2 is maintained without a slip of the CVT running clutch C2 during the power transmission.

$$Tc2 = Tinc2 * SF = Te * \gamma * SF \quad (3)$$

The shift control portion 122 controls the instruction current Isl2 of the C2 electromagnetic valve SL2 such that the instruction pressure Psl2*i* set by the instruction pressure setting portion 128 is output from the C2 electromagnetic valve SL2. As described above, in this example, the instruction current Isl2 of the C2 electromagnetic valve SL2 is changed as needed according to the input torque Tinc2 of the CVT running clutch C2 and therefore has a value lower than the conventionally set instruction current, so that the electric power consumption is reduced. Conventionally, even during release of the dog clutch D1, the instruction current Isl2 of the C2 electromagnetic valve SL2 is set to a value (hereinafter referred to as an instruction current Isl2*m*) at which the maximum pressure Psl2*m* (e.g., the line pressure PL) set during engagement of the dog clutch D1 is output, and therefore, the instruction current Isl2 becomes higher and the electric power consumption is increased. In contrast, during the release of the dog clutch D1, the instruction pressure Psl2*i* is set to a value at which the input torque Tinc2 calculated as needed is transmittable and that is lower than the maximum pressure Psl2*m* set when the dog clutch D1 is engaged, and therefore, the instruction current Isl2 is lower than the conventionally set instruction current Isl2*m*.

When a torque fluctuation occurs in the engine torque Te, the input torque Tinc2 of the CVT running clutch C2 also fluctuates according to the Eq. (1), so that a fluctuation also occurs in the instruction pressure Psl2*i* and the instruction current Isl2 of the C2 electromagnetic valve SL2. When the instruction pressure Psl2*i* fluctuates up and down, a load applied to the CVT running clutch C2 also fluctuates, and the durability of the CVT running clutch C2 may deteriorate due to this load fluctuation. If concern exists for a deterioration in the durability of the CVT running clutch C2, the instruction pressure setting portion 128 maintains the instruction pressure Psl2*i* at the same value without accordingly changing the pressure to the reduced pressure side when the input torque Tinc2 is reduced during release of the dog clutch D1, and sets the instruction pressure Psl2*i* on the increased pressure side according to the input torque Tinc2 only when the input torque Tina is increased.

For example, the instruction pressure setting portion 128 preliminarily stores a plurality of prescribed values X1 to Xn set as the instruction pressure Psl2*i* of the C2 electromagnetic valve SL2 and sets any of the prescribed values X1 to Xn as the instruction pressure Isl2*i* according to the input torque Tinc2. It is assumed that the prescribed values X1 to Xn are set to larger values when suffixes are larger numbers. While the torque capacity Tc2 of the CVT running clutch C2 calculated based on a prescribed value Xi (i=1 to n) set as the instruction pressure Psl2*i* has a value larger than the input torque Tinc2 calculated as needed, the instruction pressure setting portion 128 maintains the prescribed value Xi as the instruction pressure Psl2*i*. When the value of the input torque Tinc2 calculated as needed becomes larger than the torque capacity Tc2 calculated based on a value Xi which is set as the instruction pressure Psl2*i*, the instruction pressure setting portion 128 sets the instruction pressure Psl2*i* to another prescribed value (e.g., a prescribed value Xi+1) at which the input torque Tinc2 is transmittable. Therefore, during release of the dog clutch D1, the instruction pressure Psl2*i* increases stepwise.

Description will hereinafter be made of the case that a first prescribed value X1 and a second prescribed value X2 are set as the prescribed-values. The first prescribed value X1 is set to a hydraulic pressure value at which the input torque Tinc2 input to the CVT running clutch C2 during normal running (low-load running) is transmittable, for example. The second prescribed value X2 is set to a hydraulic pressure value at which the input torque Tinc2 input to the CVT running clutch C2 during acceleration running (high-load running) is transmittable, for example. Therefore, the second prescribed value X2 is a value higher than the first prescribed value X1.

When the dog clutch D1 is released, the instruction pressure setting portion 128 first sets the instruction pressure Psl2*i* of the SL2 pressure Psl2 to the first prescribed value X1. Even if the input torque Tinc2 fluctuates due to the torque fluctuation of the engine torque Te after setting the instruction pressure Psl2*i* to the first prescribed value X1, the instruction pressure setting portion 128 maintains the instruction pressure Psl2*i* at the first prescribed value X1 While the input torque Tinc2 calculated as needed does not exceed the torque capacity Tc2 based on the first prescribed value X1. Therefore, the durability is prevented from deteriorating due to fluctuation of the load applied to the CVT running clutch C2 resulting from the torque fluctuation. For example, even when the input torque Tinc2 significantly decreases, the instruction pressure Psl2*i* is maintained at the first prescribed value X1 and the instruction pressure Psl2*i* is not significantly reduced, so that the load applied to the CVT running clutch C2 is prevented from increasing.

If the input torque Tinc2 calculated as needed by the input torque calculating portion 126 has a value larger than the torque capacity Tc2 based on the first prescribed value X1, the instruction pressure setting portion 128 sets the second prescribed value X2 larger than the first prescribed value X1 as the instruction pressure Psl2$i$. Therefore, the input torque Tina can be transmitted by the CVT running clutch C2. When the instruction pressure setting portion 128 sets the instruction pressure Psl2$i$ of the SL2 pressure Psl2 to the second prescribed value X2, the instruction pressure setting portion 128 maintains the instruction pressure Psl2$i$ to the second prescribed value X2 while the input torque Tinc2 calculated as needed does not exceed the torque capacity Tc2 based on the second prescribed value X2. Therefore, even when the input torque Tinc2 decreases and, for example, the value of the input torque Tinc2 becomes smaller than the torque capacity Tc2 based on the first prescribed value X1, the instruction pressure Psl2$i$ is maintained at the second prescribed value X2. Since the instruction pressure Psl2$i$ is maintained at second prescribed value X2 in this way, the durability is prevented from deteriorating due to fluctuation of the load applied to the CVT naming clutch C2.

If the input torque Tinc2 calculated as needed exceeds the torque capacity Tc2 based on the second prescribed value X2, the instruction pressure setting portion 128 sets the instruction pressure Psl2$i$ to the maximum pressure Psl2$m$ defined as a predetermined value. In this case, since the torque capacity Tc2 of the CVT running clutch C2 is the maximum value defined based on design, the input torque Tinc2 is transmittable.

When an engagement command of the dog clutch D1 is output, the instruction pressure setting portion 128 sets the instruction pressure Psl2$i$ to the maximum pressure Psl2$m$ and maintains the instruction pressure Psl2$i$ to the maximum pressure Psl2$m$ during engagement of the dog clutch D1. When the dog clutch D1 is released again, the instruction pressure setting portion 128 sets the instruction pressure Psl2$i$ to the first prescribed value X1. Therefore, the instruction pressure Psl2$i$ is returned to the low-pressure side. In this way, when the dog clutch D1 is released, the instruction pressure Psl2$i$ is raised in stages depending on the input torque Tinc2, and when the dog clutch D1 is engaged, the instruction pressure Psl2$i$ is not changed to the reduced pressure side while the dog clutch D1 is not released again, so that the fluctuation of the load applied to the CVT running clutch C2 is suppressed to prevent the deterioration in durability.

Figure 6:
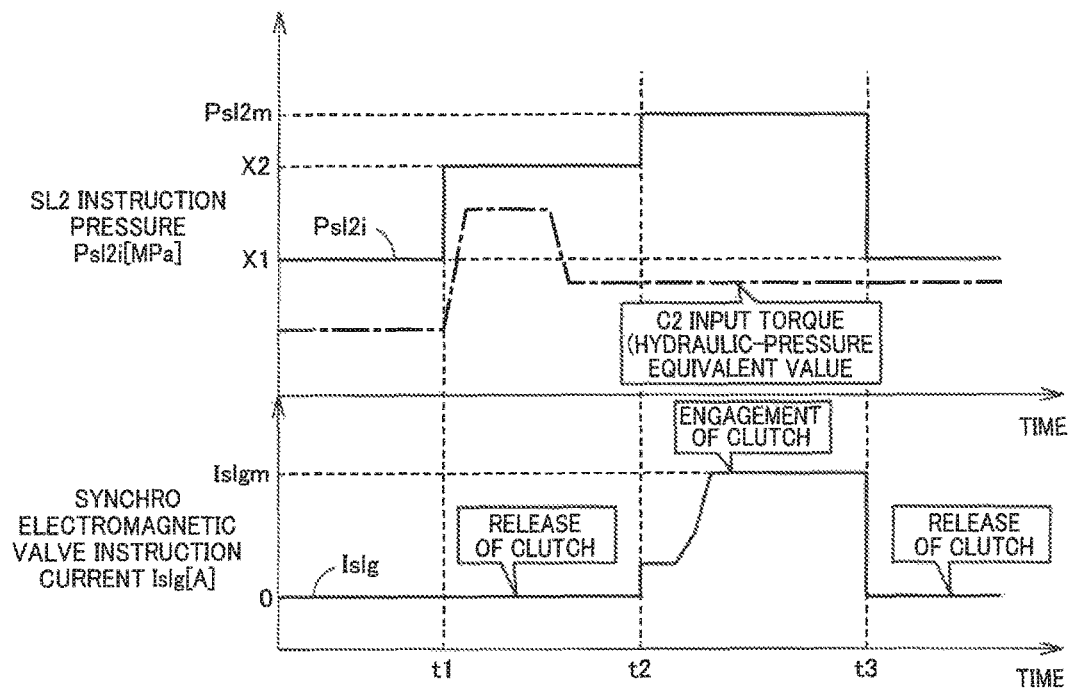
FIG. 6 is a time chart of a relationship between an instruction pressure of an SL2 pressure that is an output pressure of a C2 electromagnetic valve and an instruction current of a synchro electromagnetic valve.

FIG. 6 is a time chart of a relationship between the instruction pressure Psl2$i$ of the SL2 pressure Psl2 set by the instruction pressure setting portion 128 and the instruction current Islg of the synchro electromagnetic valve SLG. In FIG. 6, a dashed-dotted line drawn together with the instruction pressure Psl2$i$ (solid line) denotes a value acquired by converting the input torque Tinc2 input to the CVT running clutch C2 into a hydraulic pressure. In FIG. 6, the instruction current Islg of the synchro electromagnetic valve SLG substantially corresponds to the engagement state of the dog clutch D1. For example, when the instruction current Islg is zero, the SLG pressure Pslg is not output from the synchro electromagnetic valve SLG, so that the hydraulic actuator 100 operating the synchromesh mechanism S1 is not operated. Therefore, the dog clutch D1 is in a released state. On the other hand, when the instruction current Islg of the synchro electromagnetic valve SLG becomes larger than zero, the SLG pressure Pslg is output from the synchro electromagnetic valve SLG and the hydraulic actuator 100 is operated. Therefore, the dog clutch D1 is engaged via the synchromesh mechanism S1.

In FIG. 6, before time t1, the instruction current Islg of the synchro electromagnetic valve SLG is zero, and the dog clutch D1 is therefore released. At this time, as indicated by a solid line, the instruction pressure Psl2$i$ is set to the first prescribed value X1. At time t1, when the input torque Tinc2 (hydraulic-pressure equivalent value) calculated as needed and indicated by the dashed-dotted line becomes higher than the torque capacity Tc2 based on the first prescribed value X1, the instruction pressure Psl2$i$ is set to the second prescribed value X2. Therefore, although the input torque Tinc2 (hydraulic-pressure equivalent value) becomes larger than the first prescribed value X1 after time t1, the instruction pressure Psl2$i$ is accordingly set to the second prescribed value X2, so that the input torque Tinc2 is transmittable.

Even when the input torque Tinc2 (hydraulic-pressure equivalent value) becomes smaller than the first prescribed value X1 as indicated by the dashed-dotted line between time t1 and time t2, the instruction pressure Psl2$i$ is maintained at the second prescribed value X2. At time t2, when the engagement of the dog clutch D1 is started, the instruction pressure Psl2$i$ is set to the maximum pressure Psl2$m$. At time t3, when the dog clutch D1 is released, the SL2 pressure Psl2 is set to the first prescribed value X1 again. By setting the instruction pressure Psl2$i$ stepwise in an increasing direction in this way, the instruction pressure Psl2$i$ is no longer constantly set to the maximum pressure Psl2$m$, and the instruction current Isl2 of the C2 electromagnetic valve SL2 becomes lower. Additionally; since the torque capacity Te2 of the CVT naming clutch C2 is prevented from fluctuating due to fluctuation of the input torque Tinc2, the CVT running clutch C2 is prevented from deteriorating in durability. Although FIG. 6 shows as an example a form in which the first prescribed value X1 and the second prescribed value X2 are set as the prescribed values of the instruction pressure Psl2$i$, the prescribed values may more finely be set. Therefore, the instruction pressure Psl2$i$ during release of the dog clutch D1 may be changed in more stages.

Figure 7:
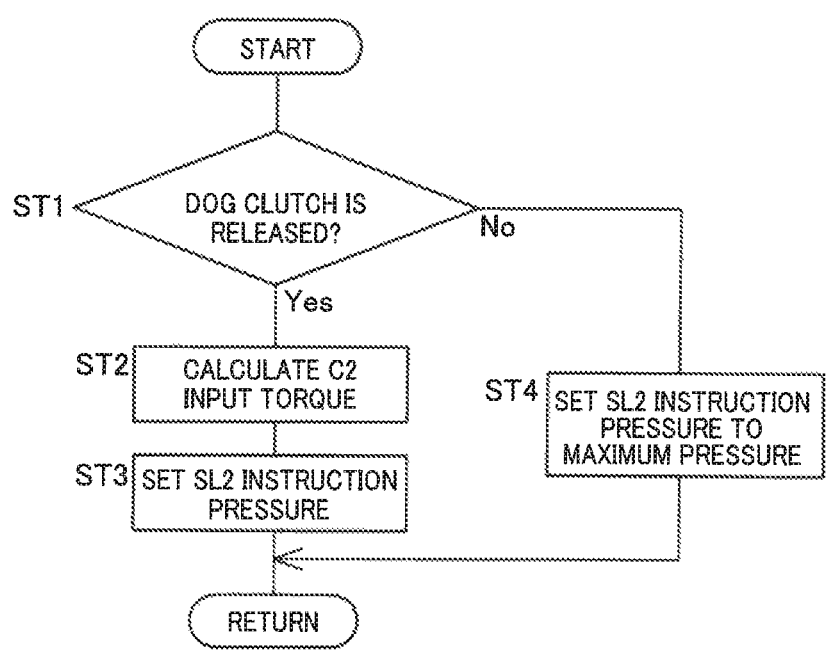
FIG. 7 is a flowchart for explaining a main portion of the control operation of an electronic control device shown in FIG. 3, i.e., a control operation capable of reducing an electric load by lowering the instruction current of the C2 electromagnetic valve during a CVT running mode.

FIG. 7 is a flowchart for explaining a main portion of the control operation of the electronic control device 80, i.e., a control operation capable of reducing the electric power consumption by lowering the instruction current Isl2 of the C2 electromagnetic valve SL2 during the CVT running mode. This flowchart is repeatedly executed during the CVT miming mode.

First, at step ST1 (hereinafter, step will be omitted) corresponding to the control function of the clutch release determining portion 124, it is determined whether the dog clutch D1 is in the released state. During engagement of the dog clutch D1, ST1 is negative and the operation goes to ST4. At ST4 corresponding to the control function of the instruction pressure setting portion 128, the SL2 pressure Psl2 is set to the maximum pressure Psl2$m$. If the dog clutch D1 is released, ST1 is affirmative and the operation goes to ST2. At ST2 corresponding to the control function of the input torque calculating portion 126, the input torque Tinc2 input to the CVT running clutch C2 is calculated. Subsequently, at ST3 corresponding to the control function of the instruction pressure setting portion 128, the instruction pressure Psl2$i$ is set based on the input torque Tinc2 calculated at ST2.

If the instruction pressure Psl2$i$ is changed (increased) stepwise in consideration of the deterioration in durability of the CVT running clutch C2, a plurality of prescribed values Xi ($i$=1 to n) set as the instruction pressure Psl2$i$ is stored in advance, and at ST3, the prescribed value Xi corresponding to the input torque Tinc2 is set as the instruction pressure Psl2$i$. Specifically, at ST3, the input torque Tinc2 calculated at ST2 is compared with the torque capacity Tc2 based on the prescribed valise Xi (e.g., the first prescribed value X1)

set in the previous cycle time, and if the torque capacity Tc2 is larger than the input torque Tinc2, the set prescribed value Xi (e.g., the first prescribed value Xi) is maintained as the instruction pressure Psl2i. On the other hand, when the input torque Tinc2 becomes larger than the torque capacity Tc2 based on the set prescribed value Xi (e.g., the first prescribed value X1), another prescribed value (e.g., the prescribed value X2) larger than the current prescribed value Xi and making the input torque Tinc2 transmittable is set as the instruction pressure Psl2i.

Figure 8:
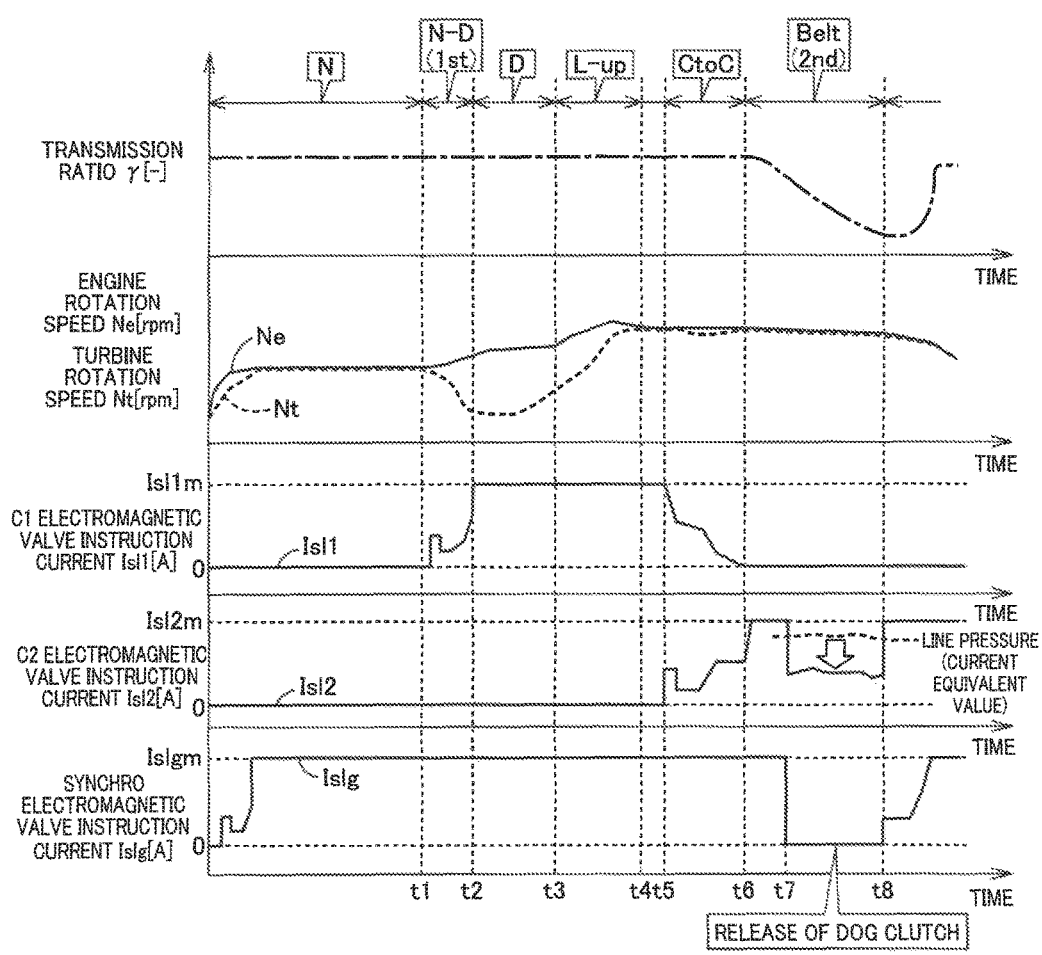
FIG. 8 is a time chart of an operation state based on the control operation of the flowchart of FIG. 7.

FIG. 8 is a time chart of an operation state based on the control operation of the flowchart of FIG. 7 and shows an operation state when the vehicle starts running as an example. In FIG. 8, the transmission ratio γ represents a transmission ratio of the power transmission device 16. An instruction current Isl1 corresponds to the instruction current of the C1 electromagnetic valve SL1 or, in other words, an instruction pressure Psl1i of the C1 electromagnetic valve SL1, and the instruction pressure Psl1i becomes higher in proportion to the instruction current Isl1. The instruction current Isl2 corresponds to the instruction current of the C2 electromagnetic valve SL2 or, in other words, the instruction pressure Psl2i of the C2 electromagnetic valve SL2, and the instruction pressure Psl2i becomes higher in proportion to the instruction current Isl2. The instruction current Islg corresponds to the instruction current of the synchro electromagnetic valve SLG or, in other words, an instruction pressure Pslgi of the synchro electromagnetic valve SLG, and the instruction pressure Pslgi becomes higher in proportion to the instruction current Islg. Therefore, the instruction current Isl1, the instruction current Isl2, and the instruction current Islg shown in FIG. 8 can be replaced with the instruction pressure Psl1i, the instruction pressure Psl2i, and the instruction pressure Pslgi, respectively.

In FIG. 8, before time t1, a shift range of the power transmission device 16 is neutral (an N range), and when the instruction current Islg of the synchro electromagnetic valve SLG is set to an instruction value Islgm in this state, the synchromesh mechanism S1 is operated and the dog clutch D1 is in the engaged state in preparation for starting the vehicle. Additionally, since the instruction currents Isl1, Isl2 are zero, the forward clutch C1 and the CVT running clutch C2 are released, and the power transmission of the power transmission device 16 is interrupted.

At time t1, when the shift range is switched from the N range to a running range (1) range), the instruction current Isl1 of the C1 electromagnetic valve SL1 is raised, so that the engagement of the forward clutch C1 is started. Consequently, the first power transmission path PT1 is switched to the power transmitting state between time t1 and time t2, and the gear running mode is enabled. Since a load is applied due to the engagement of the forward clutch C1, the turbine rotation speed Nt is reduced.

At time t2, when the instruction current reaches the maximum value Isl1m defined as a predetermined value, the engagement of the forward clutch C1 is completed, allowing the vehicle to run at the gear ratio γ1 of the first power transmission path PT1. At time t3, the engagement of the lockup clutch 19 is started so that the turbine rotation speed Nt increases, and at time t4, the engagement of the lockup clutch 19 is completed so that the engine rotation speed Ne and the turbine rotation speed Nt coincide with each other.

At time t5, switching from the gear running mode to the CVT running mode is started, i.e., the clutch-to-clutch shift (C-to-C shift) of releasing the forward clutch C1 and engaging the CVT running clutch C2 is started. Accordingly, from time t5 to time t6, the instruction current Isl1 corresponding to the SL1 pressure Psl1 is lowered along a preset track, and the instruction current Isl2 corresponding to the SL2 pressure Psl2 is raised along a preset track. At time t6, the C-to-C shift is completed, so that the first power transmission path PT1 is switched to the second power transmission path PT2, and the CVT running mode using the continuously variable transmission 24 is started. Consequently, the gear ratio γ2 is continuously varied after time t6. The instruction current Isl2 of the C2 electromagnetic valve SL2 is set to the maximum value Isl2m.

At time t7, in relation to the switching to the CVT running mode, the instruction current Islg of the synchro electromagnetic valve SLG is set to zero to release the dog clutch D1. Substantially at the same time, the instruction current Isl2 of the C2 electromagnetic valve SL2 decreases. At this time, the magnitude of the instruction current Isl2 is a value making the input torque Tinc2 calculated as needed transmittable and is changed according to the input torque Tinc2. Therefore, the instruction current Isl2 has a value lower than a value (current equivalent value) indicated by a broken line at which the SL2 pressure Psl2 output from the C2 electromagnetic valve SL2 is the line pressure PL. Although the line pressure PL varies according to the accelerator opening degree θacc etc., the line pressure PL of FIG. 8 indicates a value when the accelerator opening degree θacc etc. are the same.

At time t8, when the engagement of the dog clutch D1 is started again and the raising of the instruction current Islg is started, the instruction current Isl2 of the C2 electromagnetic valve SL2 is returned to the maximum value Isl2m. As described above, while the dog clutch D1 is released (time t7 to time t8), the instruction current Islg becomes lower than the maximum value Isl2m, so that the electric power consumption is reduced.

Figure 9:
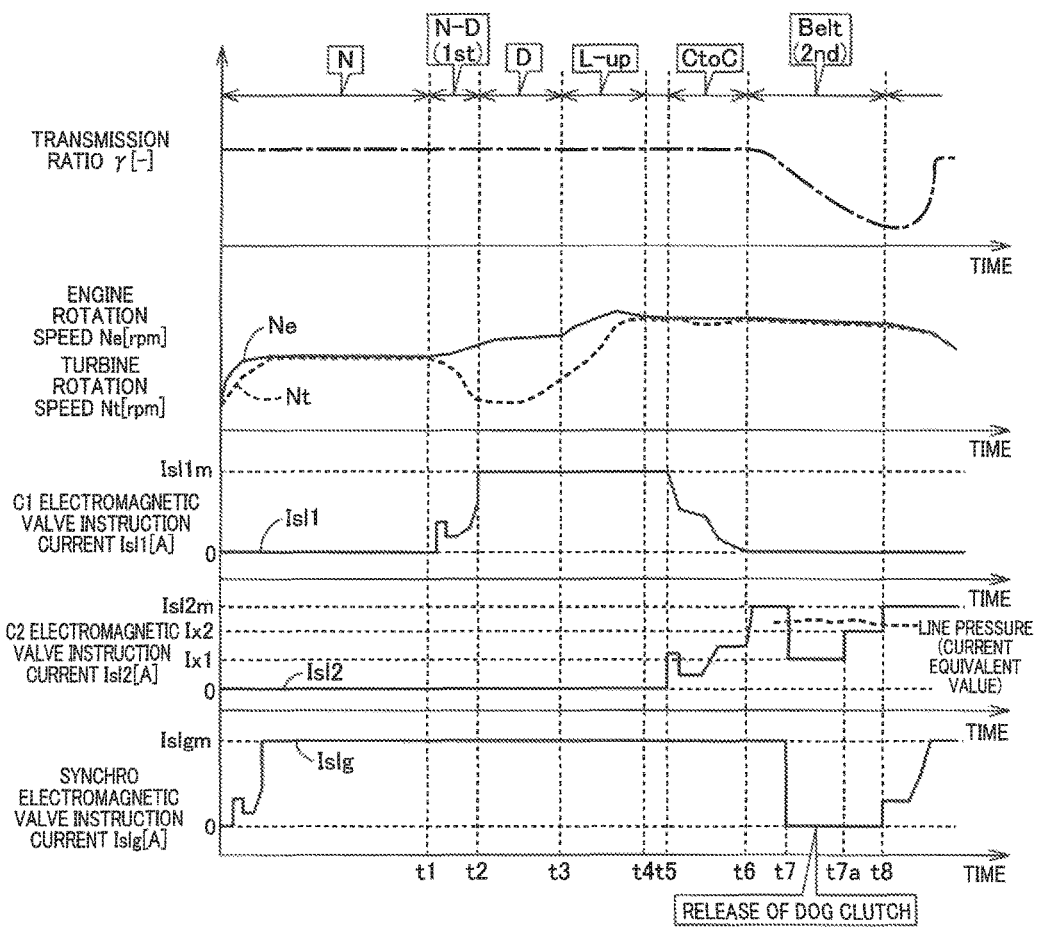
FIG. 9 is another example of the time chart of the operation state based on the control operation of the flowchart of FIG. 7.

In FIG. 8, the instruction current Isl2 of the C2 electromagnetic valve SL2 is changed as needed according to the input torque Tinc2; however, if the durability of the CVT running clutch C2 is taken into consideration as described above, the instruction current Isl2 is controlled as in a time chart shown in FIG. 9, for example.

At time t7 of the time chart of FIG. 9, when the instruction current Islg of the synchro electromagnetic valve SLG is made zero, the instruction current Isl2 of the C2 electromagnetic valve SL2 is set to a prescribed current Ix1 set in advance. The prescribed current Ix1 corresponds to a value at which the instruction pressure Psl2i of the C2 electromagnetic valve SL2 is the first prescribed value X1 set during low-load running, for example. At time t7a, when the input torque Tinc2 calculated as needed becomes larger than the torque capacity Tc2 of the CVT running clutch C2 calculated based on the first prescribed value X1, the instruction current Isl2 is set to a prescribed current Ix2 set in advance. The prescribed current Ix2 corresponds to a value at which the instruction pressure Psl2i of the C2 electromagnetic valve SL2 is the second prescribed value X2 set during high-load running, for example. Since the instruction current Isl2 of the C2 electromagnetic valve SL2 increases stepwise due to the increase of the input torque Tinc2, although the instruction current Isl2 becomes higher as compared to when the instruction current Isl2 is changed as needed according to the input torque Tinc2 as shown in the time chart of FIG. 8, the load applied to the CVT running clutch C2 is prevented from fluctuating due to fluctuation of the engine torque Te, so that the CVT running clutch C2 is prevented from deteriorating in durability.

As described above, according to this example, during release of the dog clutch D1, the first power transmission path PT1 is interrupted so that the first power transmission path PT1 and the second power transmission path PT2 are not simultaneously switched to the power transmitting state. Therefore, it is not necessary to retain the hydraulic pressure Pc2 of the hydraulic fluid supplied to the CVT running clutch C2 at a high pressure during release of the dog clutch D1, and thus, by making the instruction pressure Psl2i of the C2 electromagnetic valve SL2 controlling the hydraulic pressure Pc2 of the CVT running clutch C2 lower as compared to when the dog clutch D1 is engaged, the instruction current Isl2 of the C2 electromagnetic valve SL2 can be lowered to reduce the electric power consumption.

According to this example, the instruction pressure Psl2i of the C2 electromagnetic valve SL2 during release of the dog clutch D1 is set to a value at which the input torque Tinc2 input to the CVT running clutch C2 is transmittable and that is lower than the maximum pressure Psl2m set when the dog clutch D1 is engaged, and therefore, the instruction pressure Psl2i of the C2 electromagnetic valve SL2 becomes lower within a range in which running is not affected, so that the instruction current Isl2 of the C2 electromagnetic valve SL2 can be lowered.

According to this example, during release of the dog clutch D1, the instruction pressure Psl2i of the C2 electromagnetic valve SL2 controlling the hydraulic pressure Pc2 of the CVT running clutch C2 is not changed to the reduced pressure side, and therefore, the instruction pressure Psl2i of the C2 electromagnetic valve SL2 is restrained from fluctuating up and down due to fluctuation of the input torque Tinc2 of the CVT running clutch C2. Thus, the CVT running clutch C2 can be restrained from deteriorating in durability due to the fluctuation of the instruction pressure Psl2i for the CVT running clutch C2.

According to this example, while the input torque Tinc2 of the CVT running clutch C2 is smaller than the torque capacity Tc2 based on the prescribed value Xi set as the instruction pressure Psl2i of the C2 electromagnetic valve SL2, the instruction pressure Psl2i for the CVT running clutch C2 is maintained at the prescribed value Xi, the instruction pressure Psl2i for the CVT running clutch C2 is restrained from frequently fluctuating. Therefore, the CVT running clutch C2 can be restrained from deteriorating in durability due to the fluctuation of the instruction pressure Psl2i for the CVT running clutch C2.

Although the example of the present invention has been described in detail with reference to the drawings, the present invention also applicable to other forms.

For example, in the example described above, while the dog clutch D1 is released, the instruction pressure Psl2i of the C2 electromagnetic valve SL2 is set to a lower value as compared to when the dog clutch D1 is engaged; however, the instruction pressure Psl2i may be set to a lower value only for a part of the period during which the dog clutch D1 is released, as compared to when the dog clutch D1 is engaged.

In the example described above, the SL1 pressure Psl1 output from the C1 electromagnetic valve SL1 is directly supplied to the forward clutch C1 and the SL2 pressure Psl2 output from the C2 electromagnetic valve SL2 is directly supplied to the CVT running clutch C2; however, a pressure regulating valve for regulating the C1 pressure Pc1 of the forward clutch C1 may be interposed between the forward clutch C1 and the C1 electromagnetic valve SL1 so that the SL1 pressure Psl1 is supplied as a control pressure of the pressure regulating valve. A pressure regulating valve for regulating the C2 pressure Pc2 of the CVT running clutch C2 may be interposed between the CVT running clutch C2 and the C2 electromagnetic valve SL2 so that the SL2 pressure Psl2 is supplied as a control pressure for regulating the pressure regulating valve.

Figure 10:
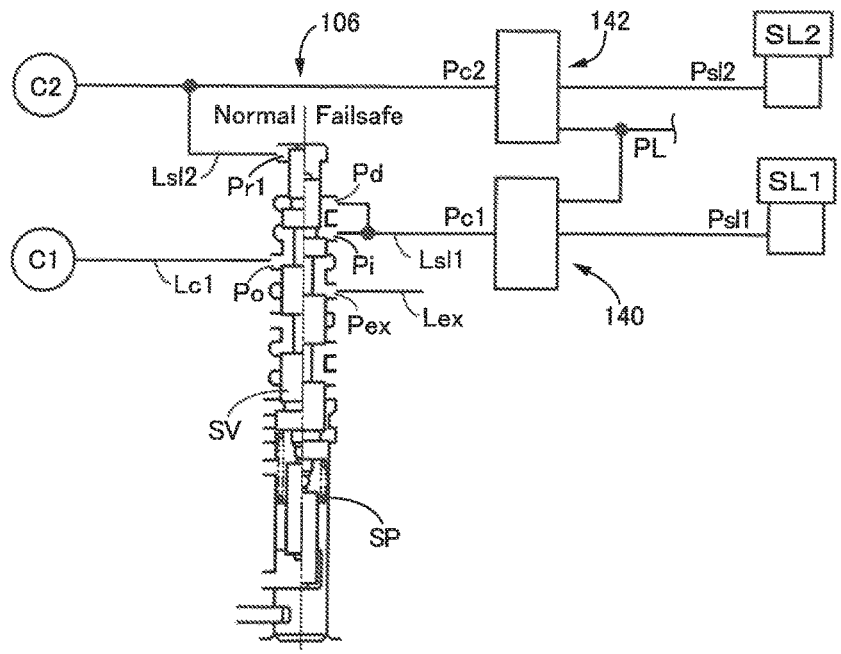
FIG. 10 is a diagram of another form of the fail-safe valve included in the hydraulic control circuit.

Specifically, as shown in FIG. 10, a first pressure regulating valve 140 is interposed between the forward clutch C1 and the C1 electromagnetic valve SL1, and a second pressure regulating valve 142 is interposed between the CVT running clutch C2 and the C2 electromagnetic valve SL2. In the fail-safe valve 106, the first oil chamber Pr1 is supplied with the C2 pressure Pc2 of the CVT running clutch C2 regulated by the second pressure regulating valve 142, and the differential port Pd is supplied with the C1 pressure Pc1 of the forward clutch C1 regulated by the first pressure regulating valve 140. Even in the configuration as described above, the fail-safe valve 106 is operated by the C1 pressure Pc1 supplied to the forward clutch C1 and the C2 pressure Pc2 supplied to the CVT running clutch C2. Additionally, during release of the dog clutch D1, the instruction pressure Psl2i of the C2 electromagnetic valve SL2 can be made lower as compared to during engagement of the dog clutch D1 to reduce the instruction current Isl2. The first pressure regulating valve 140 outputs the C1 pressure Pc1 proportional to the SL1 pressure Psl1 by using the line pressure PL as the source pressure, for example. The second pressure regulating valve 142 outputs the C2 pressure Pc2 proportional to the SL2 pressure Psl2 by using the line pressure PL as the source pressure, for example.

Figure 11:
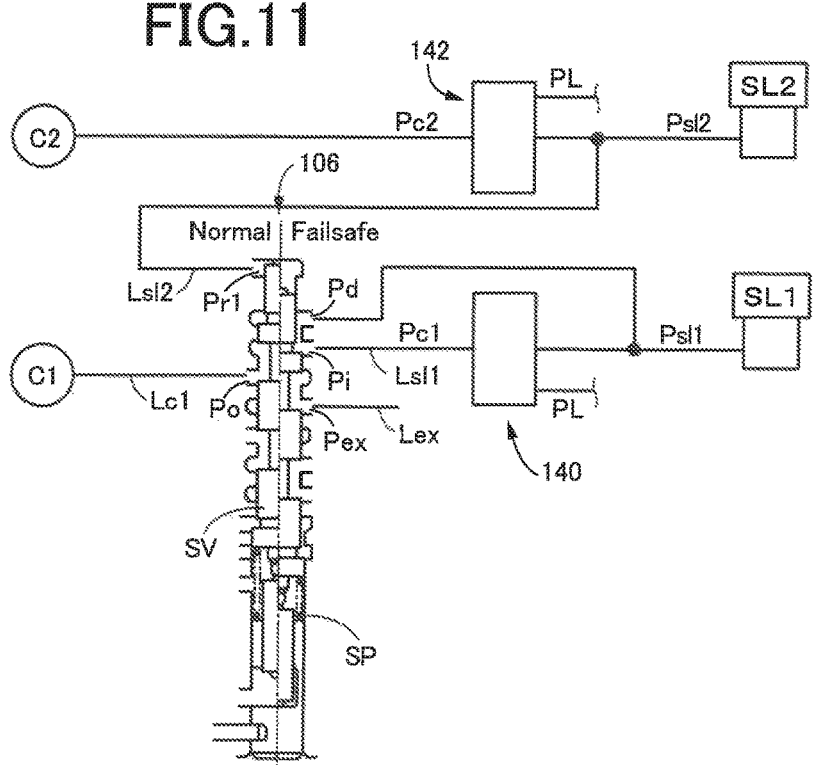
FIG. 11 is a diagram of still another form of the fail-safe valve included in the hydraulic control circuit.

As shown in FIG. 11, the present invention is also applicable when the fail-safe valve 106 is operated by the SL1 pressure Psl1 (output pressure) of the C1 electromagnetic valve SL1 controlling the C1 pressure Pc1 supplied to the forward clutch C1 and the SL2 pressure Psl2 (output pressure) of the C2 electromagnetic valve SL2 controlling the C2 pressure Pc2 supplied to the CVT running clutch C2. Specifically, the SL1 pressure Psl1 of the C1 electromagnetic valve SL1 is supplied to the differential port Pd, and the SL2 pressure Psl2 of the C2 electromagnetic valve SL2 is supplied to the first oil chamber Pr1. When the urging three Fsp of the spring SP is exceeded by the sum of the urging force F1 of the spool valve piece SV based on the SL1 pressure Psl1 and the pressure receiving area S1 in the differential port Pd and the urging force F2 of the spool valve piece SV based on the SL2 pressure Psl2 and the pressure receiving area S2 in the first oil chamber Pr1, the spool valve piece SV is moved toward the fail-safe spool position to interrupt the communication between the oil passage Lc1 connected to the forward clutch C1 and an oil passage Lsl1 connected to the first pressure regulating valve 140 and supplied with the C1 pressure Pc1. Even in the configuration as described above, during release of the dog clutch D1, the instruction pressure Psl2i of the C2 electromagnetic valve SL2 can be made lower as compared to during the engagement of the dog clutch D1 to reduce the instruction current Isl2.

Although the first prescribed value X1 and the second prescribed value X2 are set as the prescribed values of the instruction pressure Psl2i for the CVT running clutch C2 in the example described above, the number of the prescribed values may be at least one, and three or more prescribed values may be set.

Although the first power transmission path PT1 is configured to include the gear mechanism 28 and the second power transmission path PT2 is configured to include the belt-type continuously variable transmission 24 in the example described above, the present invention is not necessarily limited thereto. For example, the second power transmission path PT2 can be configured to include a toroidal type continuously variable transmission, and other changes can appropriately be made.

Although the fail-safe valve 106 interrupts the oil passage Lc1 connected to the forward clutch C1 when the fail-safe valve 106 is switched to the fail-safe spool position in the example described above, the valve may be configured to interrupt the oil passage connected to the CVT running clutch C2.

Although the C1 electromagnetic valve SL1 and the C2 electromagnetic valve SL2 are each set such that the instruction pressure (substantially the output pressure) increases in proportion to the instruction current in the example described above, this is not necessarily limited to a proportional relationship. For example, the instruction pressure may nonlinearly increase with respect to the instruction current, and the configuration is not particularly limited to the proportional relationship as long as the output pressure increases according to an increase in the instruction current.

The above description, is merely an embodiment and the present invention can be implemented in variously modified and improved forms based on the knowledge of those skilled in the art.

REFERENCE SIGNS LIST

12: Engine
14: Drive wheels
16: Power transmission device (Vehicle power transmission device
24: Continuously variable transmission
28: Gear mechanism
80: Electronic control device (Control device)
106: Fail-safe valve
128: Instruction pressure setting portion
C1: Forward clutch (First clutch)
C2: CVT running clutch (Second clutch)
D1: Dog clutch (Sub-clutch)
SV: Spool valve piece
SL1: C1 electromagnetic valve (First electromagnetic valve)
SL2: C2 electromagnetic valve (Second electromagnetic valve)
Lc1: Oil passage (Oil passage connected to the first clutch)
Lsl1: Oil passage (Oil passage supplied with a hydraulic fluid)
Lsl2: Oil passage (Oil passage connected to the second clutch)
Isl2: Instruction current
Psl2$i$: Instruction pressure
Psl2$m$: Maximum pressure
Tinc2: Input torque
X1 to Xn: Prescribed value

What is claimed is:

1. A control device of a vehicle power transmission device including a first power transmission path transmitting power by engaging a first clutch and a sub-clutch and a second power transmission path transmitting power by engaging a second clutch each disposed between an engine and drive wheels and parallel to each other, the vehicle power transmission device including a fail-safe valve for preventing simultaneous engagement of the first clutch and the second clutch, the fail-safe valve configured to be switched to a fail-safe spool position preventing simultaneous engagement of the first clutch and the second clutch by a hydraulic pressure of a hydraulic fluid supplied to the first clutch or an output pressure of a first electromagnetic valve controlling the hydraulic pressure and a hydraulic pressure of a hydraulic fluid supplied to the second clutch or an output pressure of a second electromagnetic valve controlling the hydraulic pressure, the second electromagnetic valve configured to increase the output pressure in accordance with an increase in an instruction current, the control device comprising:

an instruction pressure setting portion configured to lower an instruction pressure of the second electromagnetic valve during release of the sub-clutch as compared to when the sub-clutch is engaged.

2. The control device of a vehicle power transmission device according to claim 1, wherein the instruction pressure setting portion sets the instruction pressure of the second electromagnetic valve during release of the sub-clutch to a value at which an input torque input to the second clutch is transmittable and that is lower than the instruction pressure set when the sub-clutch is engaged.

3. The control device of a vehicle power transmission device according to claim 2, wherein the instruction pressure setting portion does not change the instruction pressure of the second clutch to a reduced pressure side during release of the sub-clutch.

4. The control device of a vehicle power transmission device according to claim 3, wherein the instruction pressure setting portion stores at least two prescribed values as the instruction pressure of the second clutch and sets the prescribed value as the instruction pressure of the second clutch, and wherein the instruction pressure setting portion maintains one of the prescribed values as the instruction pressure while a torque capacity of the second clutch based on the prescribed value set as the instruction pressure is larger than the input torque input to the second clutch, and sets the instruction pressure to another one of the prescribed values at which the input torque is transmittable, when the input torque of the second clutch becomes larger than the torque capacity based on the prescribed value.

5. The control device of a vehicle power transmission device according to claim 1, wherein the indication pressure setting portion sets the instruction pressure of the second clutch to a preset maximum pressure when an engagement command of the sub-clutch is output.

6. The control device of a vehicle power transmission device according to claim 1, wherein the fail-safe valve includes a spool valve piece switching a communication state of an oil passage, and wherein in the fail-safe valve, when a predetermined value is exceeded by a sum of an urging force of the spool valve piece based on the hydraulic pressure of the hydraulic fluid supplied to the first clutch or the output pressure of the first electromagnetic valve controlling the hydraulic pressure and the urging force of the spool valve piece based on the hydraulic pressure of the hydraulic fluid supplied to the second clutch or the output pressure of the second electromagnetic valve controlling the hydraulic pressure, the spool valve piece is moved to the fail-safe spool position to interrupt communication between one oil passage that is either an oil passage connected to the first clutch or an oil passage connected to the second clutch and an oil passage supplied with the hydraulic fluid.

7. The control device of a vehicle power transmission device according to claim 1, wherein the first power transmission path is configured to include a gear mechanism having a predetermined gear ratio, and wherein the second power transmission path is configured to include a belt-type continuously variable transmission.

* * * * *